United States Patent
Yashiro et al.

(10) Patent No.: US 11,833,800 B2
(45) Date of Patent: Dec. 5, 2023

(54) METHOD AND APPARATUS FOR FORMING THREE-DIMENSIONAL CURVED SURFACE ON LAMINATED SUBSTRATE, AND THREE-DIMENSIONAL CURVED LAMINATED SUBSTRATE

(71) Applicant: Ricoh Company, Ltd., Tokyo (JP)

(72) Inventors: Tohru Yashiro, Kanagawa (JP); Kohji Takeuchi, Kanagawa (JP); Yasuhiro Takahashi, Kanagawa (JP); Sukchan Kim, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 518 days.

(21) Appl. No.: 16/220,084

(22) Filed: Dec. 14, 2018

(65) Prior Publication Data
US 2019/0184694 A1     Jun. 20, 2019

(30) Foreign Application Priority Data

Dec. 18, 2017 (JP) ................................ 2017-242181
Dec. 18, 2017 (JP) ................................ 2017-242182
Dec. 5, 2018  (JP) ................................ 2018-228499

(51) Int. Cl.
*B32B 38/18*     (2006.01)
*B32B 37/00*     (2006.01)
(Continued)

(52) U.S. Cl.
CPC .......... *B32B 38/1866* (2013.01); *B29C 51/14* (2013.01); *B29C 51/28* (2013.01);
(Continued)

(58) Field of Classification Search
CPC ..... B32B 37/00; B32B 37/14; B32B 37/1018; B32B 38/1858; B32B 38/1866;
(Continued)

(56) References Cited

U.S. PATENT DOCUMENTS 3,769,133 A * 10/1973 Halberschmidt ........................... B32B 17/10853
156/286
4,180,426 A * 12/1979 Oustin ............... B32B 17/10293
156/286
(Continued)

FOREIGN PATENT DOCUMENTS

CN         1794019 A       6/2006
CN       102298241 A  *  12/2011
(Continued)

OTHER PUBLICATIONS

Polyvinyl Butyrals (PVB): "Properties and Applications", NPL (Year: 2021).*

(Continued)

*Primary Examiner* — Francisco W Tschen
*Assistant Examiner* — Edgaredmanuel Troche
(74) *Attorney, Agent, or Firm* — XSENSUS LLP

(57) ABSTRACT

A method for forming a three-dimensional curved surface on a laminated substrate is provided. In the method, the laminated substrate is brought into close contact with an elastic sheet. Here, the laminated substrate comprises a support substrate and a conductive layer on the support substrate, and the support substrate comprises a resin substrate comprising a thermoplastic resin. The elastic sheet is deformed while the laminated substrate is in close contact with the elastic sheet. The laminated substrate is brought into close contact with a temperature-controlled mold to soften the resin substrate.

14 Claims, 22 Drawing Sheets

(51) Int. Cl.
*B29C 51/42* (2006.01)
*B29C 51/28* (2006.01)
*B29C 51/14* (2006.01)
*B32B 37/12* (2006.01)
*B29L 31/34* (2006.01)

(52) U.S. Cl.
CPC .......... *B29C 51/428* (2013.01); *B32B 37/003* (2013.01); *B29C 2791/006* (2013.01); *B29C 2791/007* (2013.01); *B29K 2995/0005* (2013.01); *B29K 2995/007* (2013.01); *B29L 2031/3475* (2013.01); *B32B 37/12* (2013.01); *B32B 2457/208* (2013.01)

(58) Field of Classification Search
CPC ......... B32B 27/00; B32B 27/08; B32B 25/08; B32B 23/08; B32B 17/10; B32B 15/08; B32B 15/082; B32B 15/085; B32B 15/088; B32B 15/09; B32B 15/092; B32B 15/095; B32B 15/098; B32B 9/045; B32B 2457/20; B32B 2457/202; B32B 2457/204; B32B 2457/206; B32B 2457/208; B32B 2307/202; B32B 2307/412; B32B 2307/418; B32B 2307/704; B32B 27/18; G02F 1/0102; B29C 2043/3644; B29C 2043/3647; B29C 2043/3649; B29C 2043/108; B29C 33/00; B29C 43/02; B29C 43/52; Y10T 428/24983
USPC .......................................... 264/239, 241, 259
See application file for complete search history.

(56) References Cited

U.S. PATENT DOCUMENTS

| | | | |
|---|---|---|---|
| 4,504,341 A * | 3/1985 | Radzwill | B29C 51/28 156/289 |
| 2007/0052122 A1 * | 3/2007 | Teschner | B32B 17/10495 264/1.7 |
| 2007/0298231 A1 * | 12/2007 | Ito | B32B 27/00 428/213 |
| 2009/0231663 A1 | 9/2009 | Hirano et al. | |
| 2009/0256157 A1 | 10/2009 | Kondo et al. | |
| 2011/0222139 A1 | 9/2011 | Naijo et al. | |
| 2011/0279884 A1 | 11/2011 | Fujimura et al. | |
| 2012/0033286 A1 | 2/2012 | Yashiro et al. | |
| 2012/0050838 A1 | 3/2012 | Hirano et al. | |
| 2012/0139825 A1 | 6/2012 | Yashiro et al. | |
| 2012/0154892 A1 | 6/2012 | Yashiro et al. | |
| 2012/0194894 A1 | 8/2012 | Yashiro et al. | |
| 2013/0250394 A1 | 9/2013 | Okada et al. | |
| 2013/0258439 A1 | 10/2013 | Naijo et al. | |
| 2013/0335802 A1 | 12/2013 | Kim et al. | |
| 2014/0078569 A1 | 3/2014 | Takahashi et al. | |
| 2014/0268284 A1 | 9/2014 | Naijo et al. | |
| 2015/0041050 A1 | 2/2015 | Chen et al. | |
| 2015/0168796 A1 | 6/2015 | Yashiro et al. | |
| 2015/0198857 A1 | 7/2015 | Yashiro et al. | |
| 2015/0274761 A1 | 10/2015 | Sagisaka et al. | |
| 2015/0331295 A1 | 11/2015 | Takahashi et al. | |
| 2015/0378233 A1 | 12/2015 | Fujimura et al. | |
| 2016/0005375 A1 | 1/2016 | Naijo et al. | |
| 2016/0108072 A1 | 4/2016 | Inoue et al. | |
| 2016/0209721 A1 | 7/2016 | Matsumoto et al. | |
| 2016/0349590 A1 | 12/2016 | Ohshima et al. | |
| 2017/0010514 A1 | 1/2017 | Yashiro et al. | |
| 2017/0023715 A1 * | 1/2017 | Kim | G02B 5/3083 |
| 2017/0050393 A1 * | 2/2017 | Duclos | B29C 70/44 |
| 2017/0131609 A1 | 5/2017 | Okada et al. | |
| 2017/0168366 A1 | 6/2017 | Shinoda et al. | |
| 2017/0176833 A1 | 6/2017 | Goto et al. | |
| 2017/0226413 A1 | 8/2017 | Goto et al. | |
| 2017/0235203 A1 | 8/2017 | Yamamoto et al. | |
| 2017/0329197 A1 | 11/2017 | Yashiro et al. | |
| 2017/0329198 A1 | 11/2017 | Matsuoka et al. | |
| 2017/0329199 A1 | 11/2017 | Yashiro et al. | |
| 2018/0017835 A1 | 1/2018 | Kim et al. | |
| 2018/0044581 A1 | 2/2018 | Sagisaka et al. | |
| 2018/0113366 A1 | 4/2018 | Kaneko et al. | |
| 2018/0173070 A1 | 6/2018 | Yamamoto et al. | |
| 2018/0231857 A1 | 8/2018 | Kim et al. | |
| 2020/0301229 A1 * | 9/2020 | Yashiro | B29D 11/00009 |

FOREIGN PATENT DOCUMENTS

| | | | | |
|---|---|---|---|---|
| EP | 3 028 854 A1 | | 6/2016 | |
| GB | 1292905 A | * | 10/1972 | ....... B32B 17/10293 |
| GB | 2364266 A | * | 1/2002 | ........... B29C 70/443 |
| JP | 63-000906 | | 1/1988 | |
| JP | 2-276630 | | 11/1990 | |
| JP | 2002-246174 A | | 8/2002 | |
| JP | 2002-264131 A | | 9/2002 | |
| JP | 2006-082463 | | 3/2006 | |
| JP | 2008-251529 A | | 10/2008 | |
| JP | 2010-045014 | | 2/2010 | |
| JP | 2010-224110 A | | 10/2010 | |
| JP | 2015-026472 | | 2/2015 | |
| JP | 2016-105150 | | 6/2016 | |
| JP | 2016-206463 A | | 12/2016 | |
| JP | 2017-26750 A | | 2/2017 | |
| JP | 2018-010106 | | 1/2018 | |
| JP | 2018-132635 | | 8/2018 | |
| JP | 2018-151432 | | 9/2018 | |
| WO | WO 2013/175025 A1 | | 11/2013 | |
| WO | 2017/150701 A1 | | 9/2017 | |

OTHER PUBLICATIONS

Machine English translation of Yang et al. (CN-102298241-A) (Year: 2011).*
Partial European Search Report dated Apr. 17, 2019 in Patent Application No. 1821353.9, 21 pages.
Japanese Office Action dated May 31, 2022, in corresponding Japanese Patent Application 2018-228499, 4 pp.

* cited by examiner

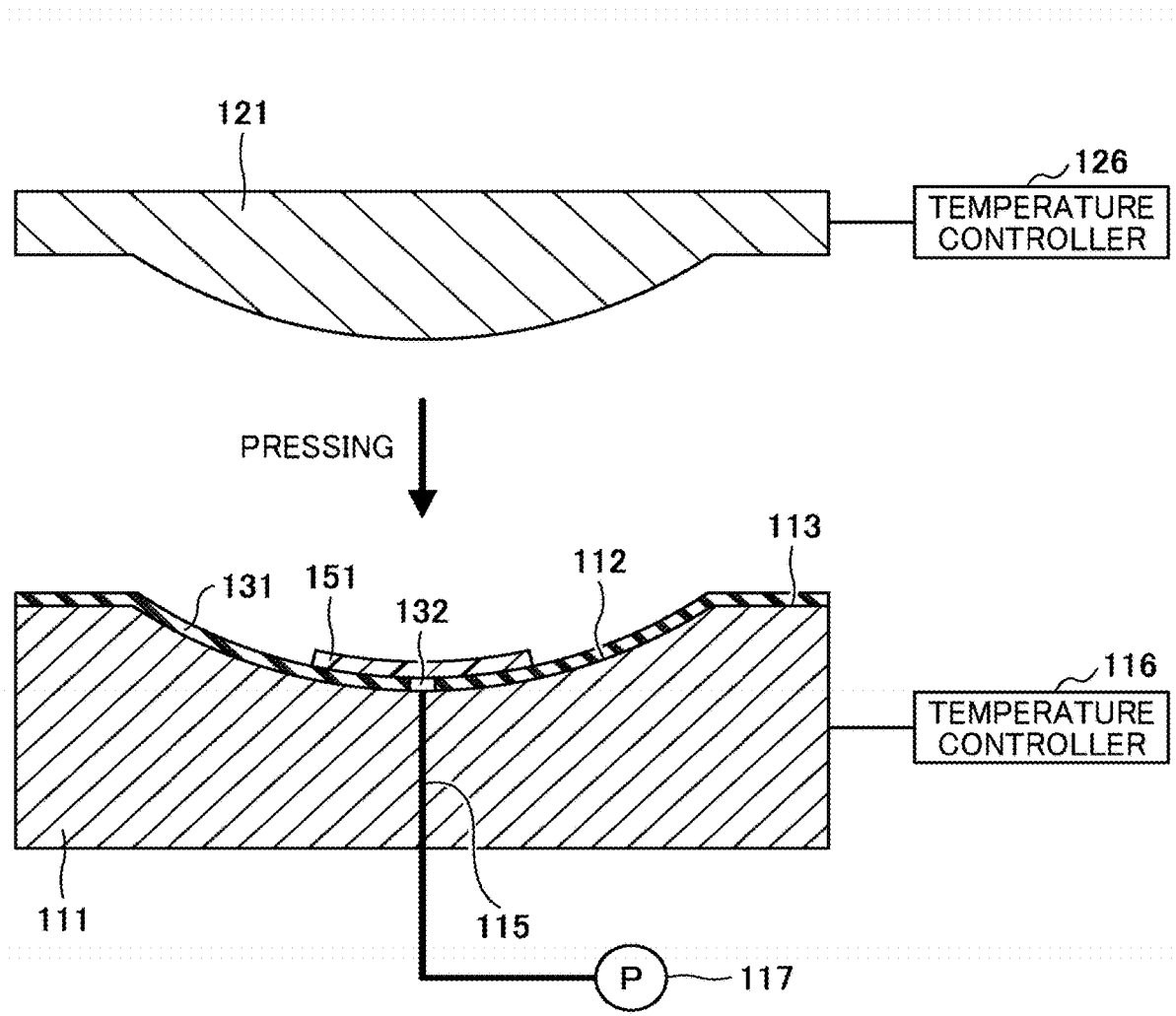

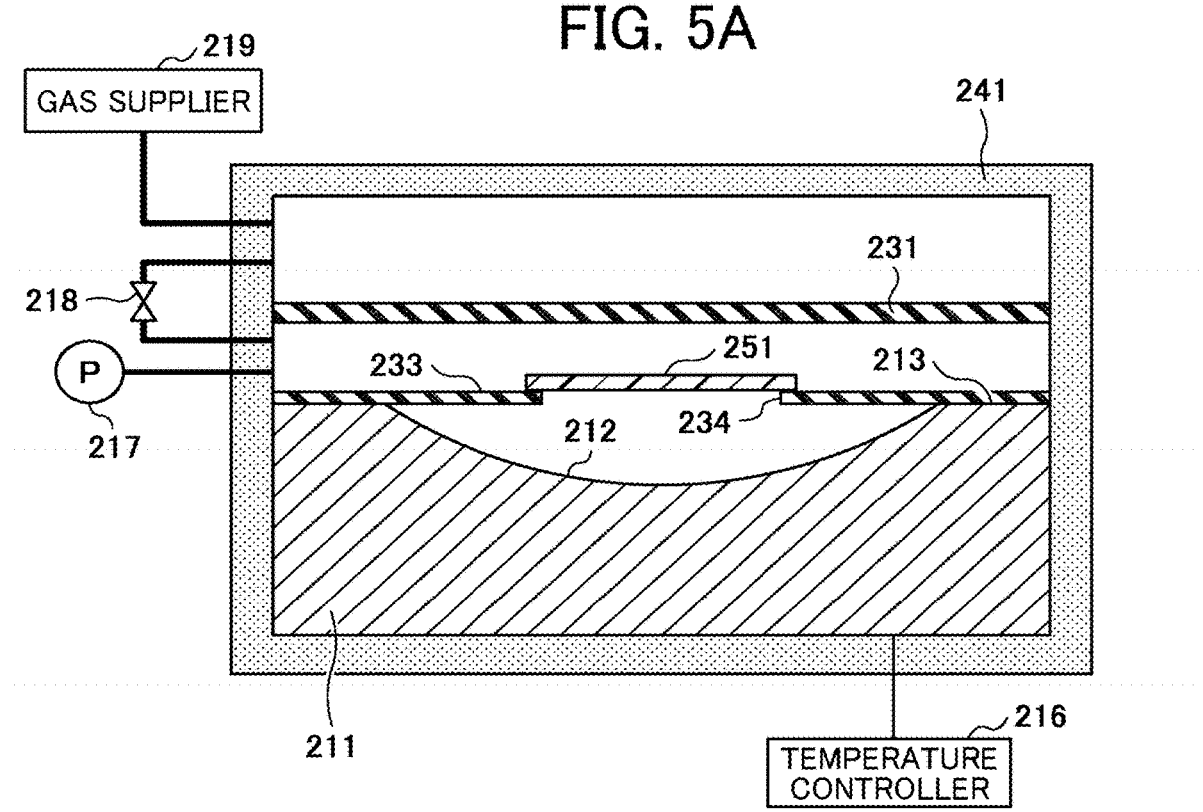
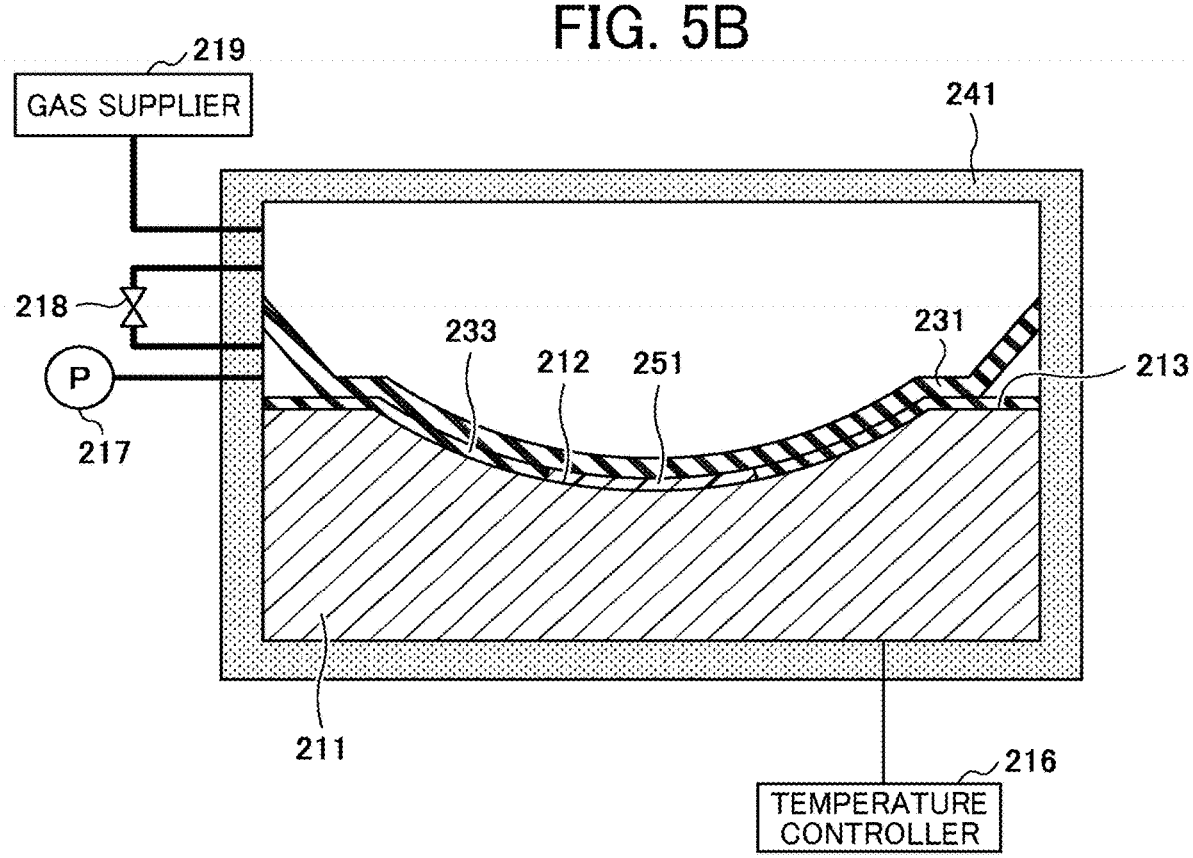

METHOD AND APPARATUS FOR FORMING THREE-DIMENSIONAL CURVED SURFACE ON LAMINATED SUBSTRATE, AND THREE-DIMENSIONAL CURVED LAMINATED SUBSTRATE

CROSS-REFERENCE TO RELATED APPLICATIONS

This patent application is based on and claims priority pursuant to 35 U.S.C. § 119(a) to Japanese Patent Application Nos. 2017-242181, 2017-242182, and 2018-228499, filed on Dec. 18, 2017, Dec. 18, 2017, and Dec. 5, 2018, respectively, in the Japan Patent Office, the entire disclosure of each of which is hereby incorporated by reference herein.

BACKGROUND

Technical Field

The present disclosure relates to a method and apparatus for forming a three-dimensional curved surface on a laminates substrate, and a three-dimensional curved laminated substrate.

Description of the Related Art

For applications of an electronic device such as a touch panel or a display, a lightweight, difficult to breakable three-dimensional (3D) curved electronic device is demanded. Particularly, for automotive or wearable applications, a 3D curved electronic device having excellent design and fitting is demanded. Such an electronic device generally includes a transparent resin substrate and a conductive layer.

Examples of the material for the conductive layer include transparent inorganic oxides such as indium oxide, carbon (CNT, graphene), metal nanowires, metal grids, and conductive polymers.

Methods of manufacturing a 3D curved electronic device can be broadly divided into the following two types: a method in which a 3D curved substrate is prepared in advance and a conductive layer and/or an organic electronic material layer are formed on the surface of the substrate; and a method in which a conductive layer and/or an organic electronic material layer are formed on a flat plate-like substrate in advance and the substrate having the layers thereon is thereafter processed into a 3D curved surface shape. Various processes have been studied for both of the two types.

However, in the former method, it may be difficult to form a uniform film on the 3D curved substrate, or it may be difficult to bond 3D curved substrates to each other. Further, since a general film forming apparatus suitable for a flat plate-like substrate cannot be used as it is for a 3D curved substrate, a film forming apparatus exclusive for a 3D curved substrate should be prepared, resulting in a remarkable increase in cost.

In addition, it may be difficult to obtain a 3D curved laminated substrate by processing the conventional conductive layer into a 3D curved surface shape, since inorganic oxide is brittle and easily breakable due to its large Young's modulus. That is, the conductive layer of inorganic oxide has low flexibility and easily breakable. Thus, the conductive layer cannot withstand biaxial bending and cracks occur. In addition, inorganic oxide tends to strain greatly in the direction along the curved surface. Moreover, when a substrate having a functional layer, such as an organic electronic material layer, on the conductive layer of inorganic oxide is processed to have a three-dimensional shape, strain generated in the conductive layer propagates to the functional layer and a large strain is likely to occur in the functional layer. Furthermore, in a case in which mechanical properties are not uniform within the conductive layer, such as a case in which a plurality of thin film transistors (TFTs) is arranged in a matrix within the conductive layer, variation in strain of the functional layer is large and variation in performance tends to be large. It has been difficult to suppress cracks in the conductive layer while maintaining excellent transparency, conductivity, and durability.

SUMMARY

In accordance with some embodiments of the present invention, a method for forming a three-dimensional curved surface on a laminated substrate is provided. In the method, the laminated substrate is brought into close contact with an elastic sheet. Here, the laminated substrate comprises a support substrate and a conductive layer on the support substrate, and the support substrate comprises a resin substrate comprising a thermoplastic resin. The elastic sheet is deformed while the laminated substrate is in close contact with the elastic sheet. The laminated substrate is brought into close contact with a temperature-controlled mold to soften the resin substrate.

In accordance with some embodiments of the present invention, an apparatus for forming a three-dimensional curved surface on a laminated substrate is provided. Here, the laminated substrate comprises a support substrate and a conductive layer on the support substrate, and the support substrate comprises a resin substrate comprising a thermoplastic resin. The apparatus includes a temperature-controllable mold and an elastic sheet. The elastic sheet is configured to deform while being in close contact with the laminated substrate and to bring the laminated substrate into close contact with the mold.

In accordance with some embodiments of the present invention, a three-dimensional curved laminated substrate is provided. The three-dimensional curved laminated substrate comprises a support substrate and a conductive layer on the support substrate. The support substrate comprises a resin substrate comprising a thermoplastic resin, and the surface of the support substrate has a hardness of 180 MPa or more.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3 is a schematic diagram illustrating a variation of the curved surface forming apparatus suitable for forming a curved surface of a laminated substrate according to the first embodiment;

FIGS. 5A and 5B are schematic diagrams illustrating the steps in the method for forming a curved surface on a laminated substrate according to the second embodiment;

Figure 1:
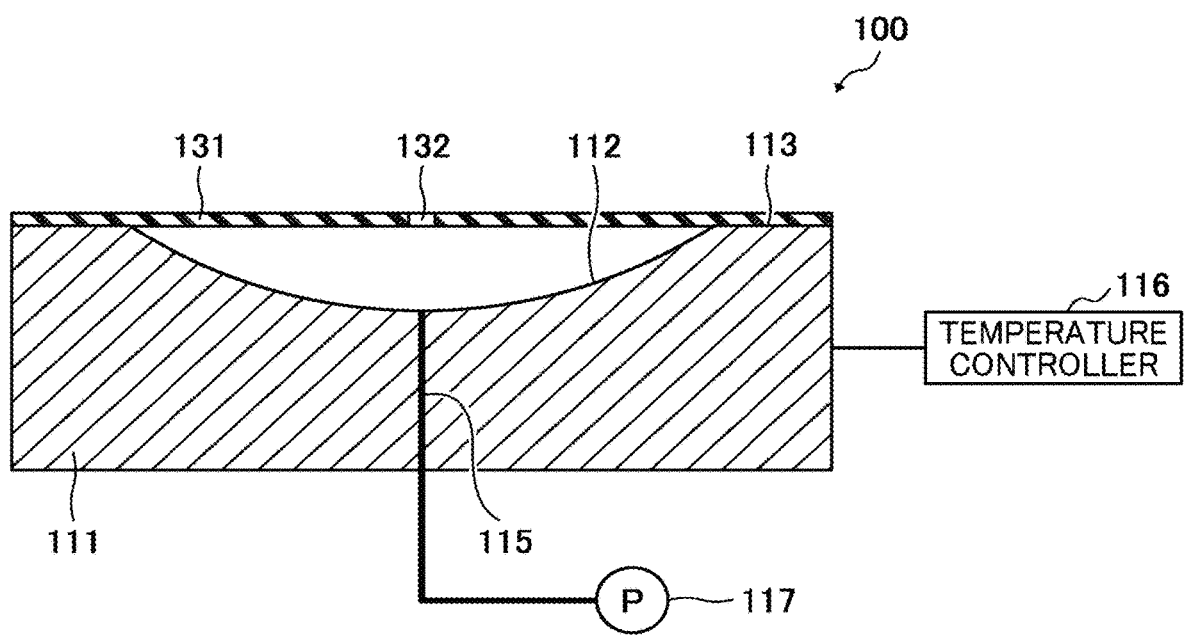
FIG. 1 is a schematic diagram illustrating a curved surface forming apparatus suitable for conducting a method for forming a curved surface on a laminated substrate according to the first embodiment.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that have a similar function, operate in a similar manner, and achieve a similar result.

For the sake of simplicity, the same reference number will be given to identical constituent elements such as parts and materials having the same functions and redundant descriptions thereof omitted unless otherwise stated.

In accordance with some embodiments of the present invention, a method and an apparatus for forming a curved surface on a laminated substrate are provided capable of enhancing reliability of the resulting 3D curved electronic devices while suppressing cost increase.

In accordance with some embodiments of the present invention, a 3D curved laminated substrate is provided having excellent transparency, conductivity, and durability and capable of suppressing the occurrence of cracks.

Hereinafter, embodiments of the present invention will be described with reference to the drawings.

First Embodiment

Figure 2A:
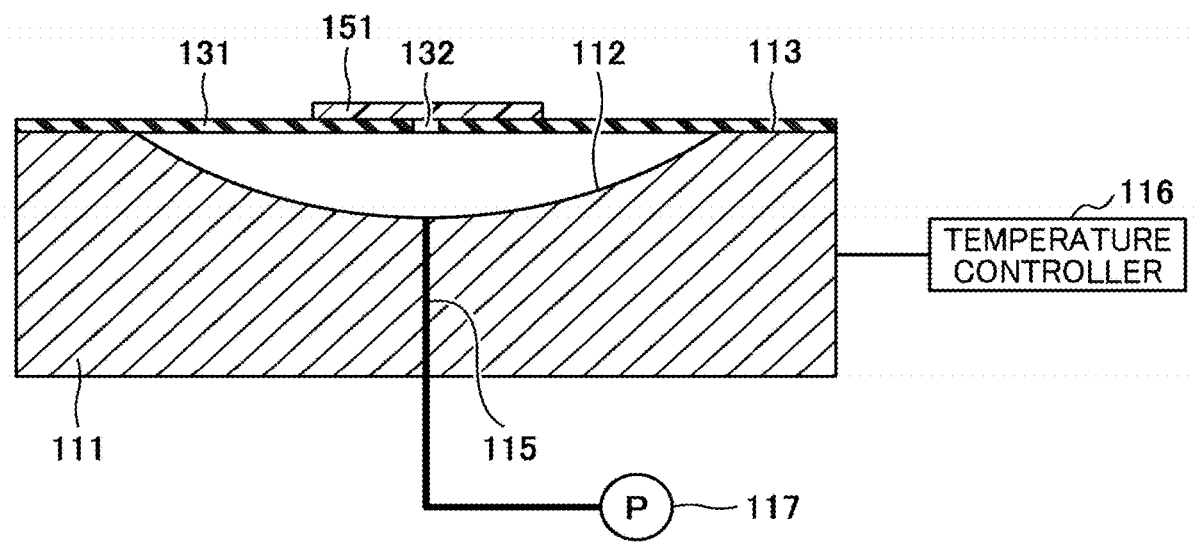
FIGS. 2A and 2B are schematic diagrams illustrating the steps in the method for forming a curved surface on a laminated substrate according to the first embodiment.
Figure 2B:
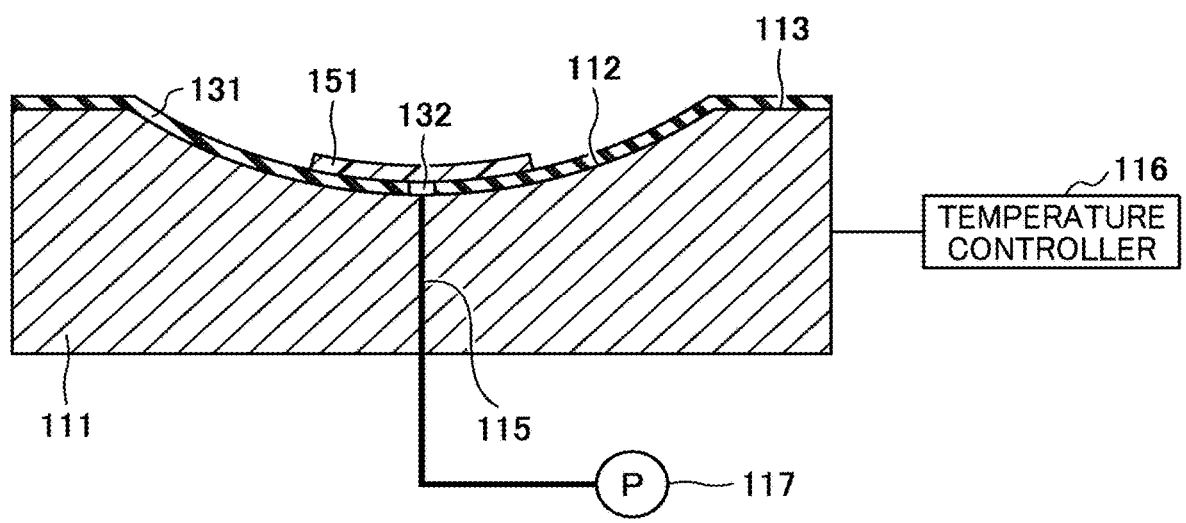

First, a method for forming a curved surface on a laminated substrate according to a first embodiment is described below. FIG. 1 is a schematic diagram illustrating a curved surface forming apparatus suitable for conducting the method for forming a curved surface on a laminated substrate according to the first embodiment. FIGS. 2A and 2B are schematic diagrams illustrating the steps in the method for forming a curved surface on a laminated substrate according to the first embodiment.

A curved surface forming apparatus 100 includes a concave mold 111 and a temperature controller 116 for controlling the temperature of the concave mold 111. A hole 115 is formed in the concave mold 111 to connect the back side of the concave mold 111 and the bottom of a concave surface 112 having a three-dimensional (3D) curved surface shape such as spherical shape. A pump 117 is connected to the hole 115. The curved surface forming apparatus 100 includes an elastic sheet 131 disposed on a flat surface 113 around the concave surface 112 of the concave mold 111 so as to close the concave surface 112. The elastic sheet 131 is formed with a hole 132 penetrating the front and back surfaces thereof In the 3D curved surface forming method using the curved surface forming apparatus 100, first, a laminated substrate 151 is prepared as illustrated in FIG. 2A. The laminated substrate 151 comprises a support substrate and a conductive layer on the support substrate, where the support substrate comprises a resin substrate made of a thermoplastic resin. The concave mold 111 is heat-controlled by the temperature controller 116 to have a temperature around the softening temperature (Tg) of the resin substrate. The laminated substrate 151 is then placed on the elastic sheet 131 so as to close the hole 132. For example, the controlled temperature may be lower than the softening temperature (Tg). The laminated substrate 151 may have a functional layer such as an organic electronic material layer on the conductive layer.

Subsequently, the pump 117 is operated to exhaust air in the space between the concave surface 112 and the elastic sheet 131. As a result, the elastic sheet 131 closely adheres to the concave surface 112 while stretching. In addition, the laminated substrate 151 closely adheres to the elastic sheet 131 and comes close to the concave mold 111 as the elastic sheet 131 deforms. Thus, heat is transferred from the concave mold 111 to the laminated substrate 151 and the resin substrate contained in the laminated substrate 151 is softened. As a result, as illustrated in FIG. 2B, the laminated substrate 151 closely adheres to the concave mold 111 and plastically deforms so as to follow the concave surface 112.

The operation of the pump 117 is thereafter stopped to open the hole 115 to the atmosphere, so that the elastic sheet 131 returns to the original shape and the laminated substrate 151 can be released from the concave mold 111. Since the resin substrate has been plastically deformed, the laminated substrate 151 maintains a shape conforming to the concave surface 112 even after being released from the concave mold 111.

In this manner, the laminated substrate 151 can be processed into a 3D curved surface shape.

In the first embodiment, since the elastic sheet 131 stretches isotropically during the processing, the laminated substrate 151 is uniformly pressed against and brought into close contact with the concave mold 111. The resin substrate contained in the laminated substrate 151, which has not been heated and softened in advance, is brought into close contact with the temperature-controlled concave mold 111 and gradually receives heat to soften. According to the first embodiment, it is possible to deform the conductive layer contained in the laminated substrate 151 while suppressing the occurrence of strain and cracking in the direction along the curved surface. In a case in which a functional layer is disposed on the conductive layer, strain and cracking of the functional layer can also be suppressed. Even in a case in which mechanical properties are not uniform within the conductive layer, such as a case in which a plurality of thin film transistors (TFTs) is arranged in a matrix within the conductive layer, variation in strain of the functional layer can be suppressed and uniform performance can be obtained.

As illustrated in FIG. 3, the curved surface forming apparatus 100 may further include a convex mold 121 fitted in the concave mold 111 and a temperature controller 126 for controlling the temperature of the convex mold 121. In this curved surface forming apparatus 100, the laminated substrate 151 is brought into close contact with the concave mold 111 first and thereafter pressed by the convex mold 121 heat-controlled by the temperature controller 126, thereby forming a curved surface with an improved accuracy.

Second Embodiment

Figure 4:
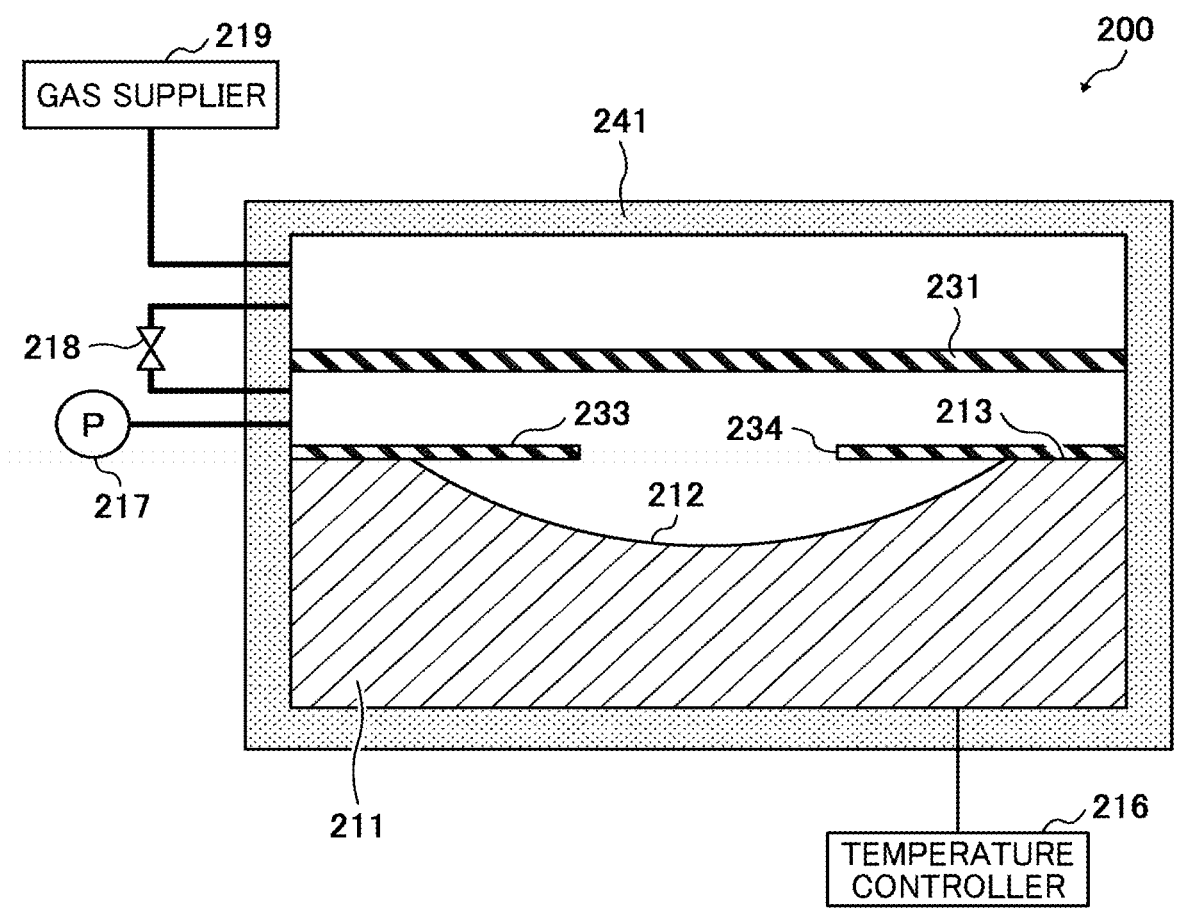
FIG. 4 is a schematic diagram illustrating a curved surface forming apparatus suitable for conducting a method for forming a curved surface on a laminated substrate according to the second embodiment.

Next, a method for forming a curved surface on a laminated substrate according to a second embodiment is described below. FIG. 4 is a schematic diagram illustrating a curved surface forming apparatus suitable for conducting the method for forming a curved surface on a laminated substrate according to the second embodiment. FIGS. 5A and 5B are schematic diagrams illustrating the steps in the method for forming a curved surface on a laminated substrate according to the second embodiment.

A curved surface forming apparatus 200 includes a sealed container (chamber) 241, a concave mold 211 in the sealed container 241, and a temperature controller 216 for controlling the temperature of the concave mold 211. The curved surface forming apparatus 200 includes an elastic sheet 231 which bisects the space above the concave mold 211 in the closed container 241 in the vertical direction. The curved surface forming apparatus 200 includes a substrate holding rubber sheet 233 disposed so as to cover a concave surface 212 of the concave mold 211, having a 3D curved surface shape such as spherical shape, while leaving a gap between a flat surface 213 around the concave surface 212. In the substrate holding rubber sheet 233, a hole 234 is formed that has a narrower area than the laminated substrate to be processed and that is to be covered with the laminated substrate. The substrate holding rubber sheet 233 is provided so as to expose a part of the concave surface 212. The pressures in the upper and lower spaces of the substrate holding rubber sheet 233 become equal even in a state in which the laminated substrate is placed thereon. For example, holes may be formed in the substrate holding rubber sheet 233 apart from the hole 234 so as not to be covered by the laminated substrate, or the end portion of the substrate holding rubber sheet 233 may be positioned on the concave surface 212 side relative to the boundary between the concave surface 212 and the flat surface 213. The curved surface forming apparatus 200 is provided with a pipe connecting a space above the elastic sheet 231 and a space below the elastic sheet 231, and a bypass valve 218 is provided in this pipe. A gas supplier 219 is connected to the space above the elastic sheet 231, and a pump 217 is connected to the space below the elastic sheet 231.

In the 3D curved surface forming method using the curved surface forming apparatus 200, first, a laminated substrate 251 is prepared as illustrated in FIG. 5A. The laminated substrate 251 comprises a support substrate and a conductive layer on the support substrate, where the support substrate comprises a resin substrate made of a thermoplastic resin. The concave mold 211 is heat-controlled by the temperature controller 216 to have a temperature around the softening temperature (Tg) of the resin substrate. The sealed container 241 is then opened, the laminated substrate 251 is placed on the substrate holding rubber sheet 233 so as to close the hole 234, and the sealed container 241 is closed. The laminated substrate 251 may have a functional layer such as an organic electronic material layer on the conductive layer.

Subsequently, the bypass valve 218 is opened and the pump 217 is operated. As a result, the entire interior of the sealed container 241 is put into a reduced pressure state. The bypass valve 218 is thereafter closed and the gas supplier 219 supplies gas to the space above the elastic sheet 231. As the gas, for example, air or nitrogen gas may be supplied. As a result, the elastic sheet 231 stretches and closely adheres to the laminated substrate 251, and the laminated substrate 251 and the substrate holding rubber sheet 233 are pressed against the concave surface 212 to closely adhere thereto. At this time, heat is transferred from the concave mold 211 to the laminated substrate 251, and the resin substrate contained in the laminated substrate 251 is softened. As a result, as illustrated in FIG. 5B, the laminated substrate 251 plastically deforms so as to follow the concave surface 212.

The operation of the pump 217 and the supply of gas from the gas supplier 219 are thereafter stopped to open the sealed container 241 to the atmosphere, so that the elastic sheet 231 returns to the original shape and the laminated substrate 251 can be released from the concave mold 211. Since the resin substrate has been plastically deformed, the laminated substrate 251 maintains a shape conforming to the concave surface 212 even after being released from the concave mold 211.

In this manner, the laminated substrate 251 can be processed into a 3D curved surface shape.

In the second embodiment, since the elastic sheet 231 stretches isotropically during the processing, the laminated substrate 251 is uniformly pressed against and brought into close contact with the concave mold 211. The resin substrate contained in the laminated substrate 251, which is not heated and softened in advance, is pressed against and brought into close contact with the temperature-controlled concave mold 211 and gradually receives heat and softens. According to the second embodiment, it is possible to deform the conductive layer contained in the laminated substrate 251 while suppressing the occurrence of strain and cracking in the direction along the curved surface. In a case in which a functional layer is disposed on the conductive layer, strain and cracking of the functional layer can also be suppressed. Even in a case in which mechanical properties are not uniform within the conductive layer, such as a case in which a plurality of thin film transistors (TFTs) is arranged in a matrix within the conductive layer, variation in strain of the functional layer can be suppressed and uniform performance can be obtained. A laminated substrate containing a functional layer is suitable for manufacturing a plastic electronic device.

Figure 6:
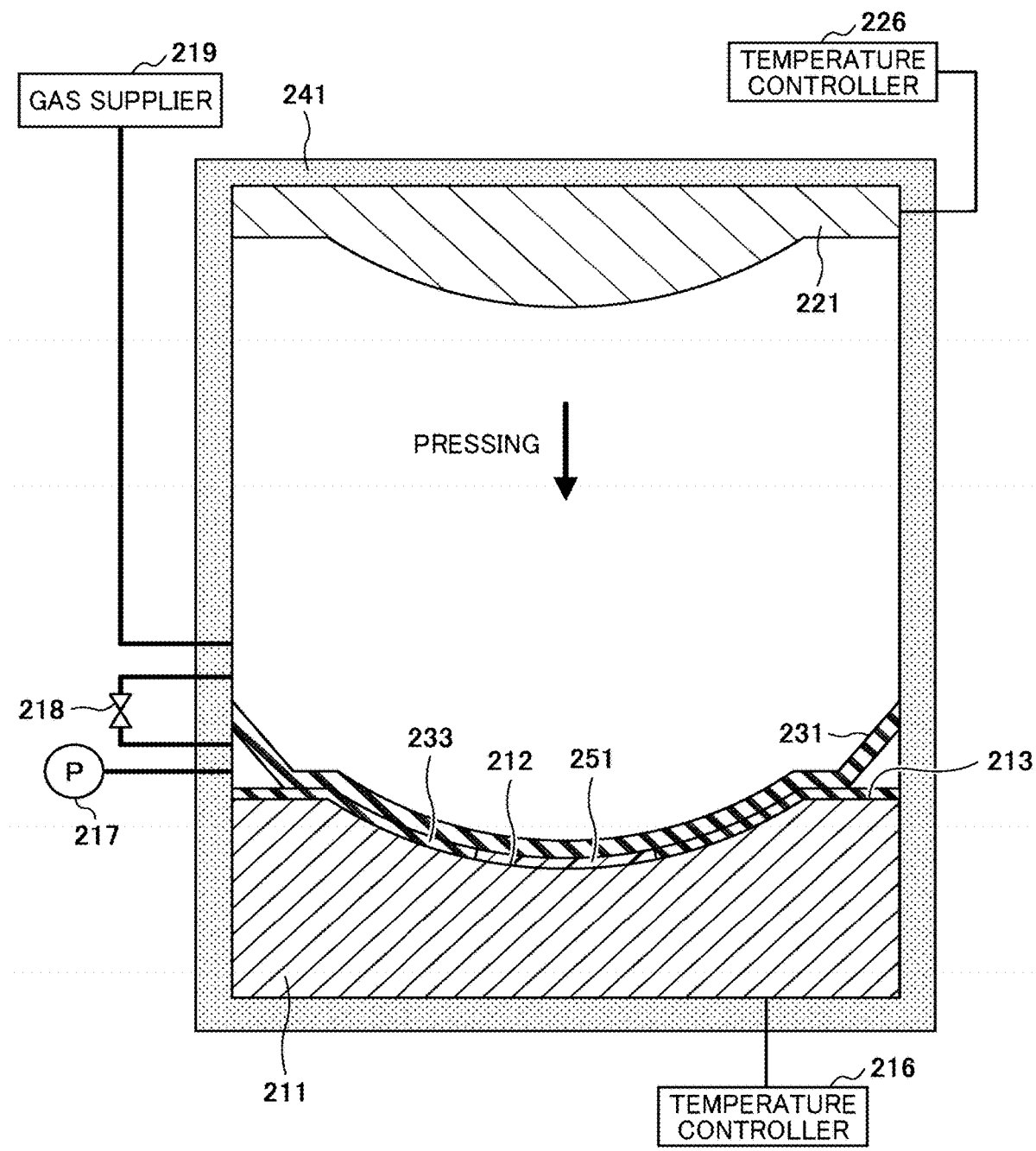
FIG. 6 is a schematic diagram illustrating a variation of the curved surface forming apparatus suitable for forming a curved surface of a laminated substrate according to the second embodiment.

As illustrated in FIG. 6, the curved surface forming apparatus 200 may further include a convex mold 221 fitted in the concave mold 211 and a temperature controller 226 for controlling the temperature of the convex mold 221. In this curved surface forming apparatus 200, the laminated substrate 251 is brought into close contact with the concave mold 211 and thereafter pressed by the convex mold 221 heat-controlled by the temperature controller 226, thereby forming a curved surface with an improved accuracy.

In the process of opening the bypass valve 218 and operating the pump 217, it is preferable that the pressure inside the sealed container 241 is adjusted to 80,000 Pa or less. In the process of supplying gas from the gas supplier 219, it is preferable that the pressure in the space above the elastic sheet 231 is adjusted to from 0.05 to 1 MPa. It may be difficult to achieve good curved surface accuracy outside the above ranges of these conditions.

In the first and second embodiments, it is preferable that, in a plan view, the concave surface of the concave mold be wider than the laminated substrate to be processed. In this case, the entire laminated substrate can be brought into close contact with the concave surface without constraint and processed into a 3D curved surface shape while further suppressing strain. On the other hand, when the laminated substrate is processed with the end portion fixed or when the laminated substrate is processed with the end portion in contact with a portion other than the processing surface of the mold, it is likely that strain occurs from the fixed portion or the portion contacting the other portion than the processing surface. In the case of using a convex mold, there may be a case in which the laminated substrate and the convex mold come into point-contact with each other, causing stress concentration at the point and thereby causing strain. A preferable magnitude (expansion/contraction amount) of strain in the direction along the curved surface is 1% or less.

In temperature control, for example, the temperatures of the concave mold and the convex mold are set lower than the softening temperature (Tg) of the resin substrate, and the temperature of the flat-plate-like laminated substrate before being brought into close contact with the concave mold is set to room temperature or a temperature 20° C. or more lower than the softening temperature.

Additional processing may be performed in order to improve the accuracy of the 3D curved surface after processing the laminated substrate into a 3D curved surface shape by the method according to the first or second embodiment. Specifically, a process of holding the laminated substrate in a mold and reheating and pressurizing it may be employed. More specifically, molding methods such as injection molding and forming methods such as autoclave may be employed.

In a case in which the conductive layer is a transparent conductive layer of an inorganic oxide, it is preferable that the surface of the support substrate of the conductive layer has a hardness of 180 MPa or more in order to suppress the occurrence of cracking. The support substrate may comprise, for example, a resin substrate alone or a resin substrate and a base layer formed thereon. The hardness of the surface of the support substrate is measured with a nanoindenter. The inventors of the present invention have confirmed that no crack occurred on a certain laminated substrate, in which a transparent conductive layer having a thickness of 110 nm containing indium oxide as an inorganic oxide is formed on a planer elliptical substrate having a surface hardness of 180 MPa or more, a major axis dimension of 85 mm, and a minor axis dimension of 54.5 mm, when processed into a spherical shape having a radius of curvature of 86 mm. Use of a support substrate having a hard surface makes it possible to reduce strain of the transparent conductive layer during processing.

Hereinafter, the constituent elements included in the curved surface forming apparatus 100 or 200 are described.

Elastic Sheets 131 and 231

The elastic sheets 131 and 231 are stretchable by reducing or applying pressure and have a function of bringing the laminated substrate into close contact with the mold. The elastic sheet 131 also has a function of transmitting the heat of the mold to the laminated substrate. As the material of the elastic sheet, any known elastic rubber materials can be used. Specific examples of the material of the elastic sheet include, but are not limited to, natural rubber, styrene butadiene rubber (SBR), isoprene rubber (TR), butadiene rubber (BR), chloroprene rubber (CR), acrylonitrile butadiene rubber (NBR), butyl rubber (isobutene isoprene rubber (IIR)), ethylene propylene rubber (EPM), ethylene propylene diene rubber (EPDM), urethane rubber (U), silicone rubber (silicone rubber (Si, Q)), and fluororubber (FKM). In addition, thermoplastic elastomers of styrene type, olefin type, ester type, urethane type, amide type, polyvinyl chloride (PVC) type, and fluorine type may also be used as the material of the elastic sheet. The material of the elastic sheet is preferably selected in accordance with conditions such as temperature and pressure at the time of forming a curved surface on the laminated substrate. For example, it is preferable to select the material in consideration of heat resistance, elasticity, and the like, according to the conditions. The thickness of the elastic sheet may be, for example, in a range of from 0.01 to 2.0 mm within which it is easy to form a curved surface.

In view of uniform deformation of the laminated substrate, it is preferable that the elastic sheet is hardly adhered to the laminated substrate and the mold, and the surface of the elastic sheet in contact with the laminated substrate or the mold is easily slidable. After formation of the curved surface, the elastic sheet is separated from the mold and the laminated substrate is released from the elastic sheet. Therefore, it is preferable that the elastic sheet has been surface-processed for reducing friction. As the material of the elastic sheet, silicone rubber and fluorine rubber are particularly preferable.

The hole 132 of the elastic sheet 131 is provided for adsorbing and holding the laminated substrate 151 on the elastic sheet 131. The number of the holes 132 may be one or two or more. The position of the hole 132 can be arbitrarily set according to the shape of the laminated substrate 151. In a case in which the elastic sheet 131 has adhesive property, the laminated substrate 151 can be held thereon without forming any hole.

Molds 111, 121, 211, and 221

As for the concave mold and the convex mold, a general mold can be used as it is, so long as it has a 3D curved surface shape such as spherical shape to be formed on the laminated substrate and has a heat capacity suitable for processing. Specifically, metal materials such as aluminum (Al) and nickel (Ni), glass, and ceramics can be used as the material of the mold. The temperature controller has a temperature control heater attached to the inside of the mold or the outer surface of the mold. The surface of the mold may have a general heat-resistant treatment and/or a mold release treatment.

The position of the hole 115 of the concave mold 111 can be arbitrarily set according to the shape of the laminated substrate 151.

Substrate Holding Rubber Sheet

The substrate holding rubber sheet has a function of holding the laminated substrate and maintaining a space between the laminated substrate and the concave mold. As the material of the substrate holding rubber sheet, the same material as the material of the elastic sheet can be used. The thickness and shape of the substrate holding rubber sheet can be set according to the above functions of holding the laminated substrate and maintaining the space. Even when the laminated substrate 251 is placed directly on the concave mold 211, if the upper and lower spaces of the laminated substrate 251 communicate with each other and the pressure becomes equal therebetween, the substrate holding rubber sheet 233 is not necessarily used.

Next, examples of the laminated substrate as a target for forming a curved surface are described.

First Example of Laminated Substrate

Figure 7A:
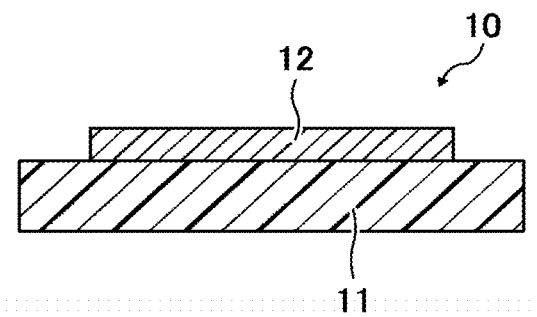
FIGS. 7A to 7C are cross-sectional views of a laminated substrate according to the first example.
Figure 7B:
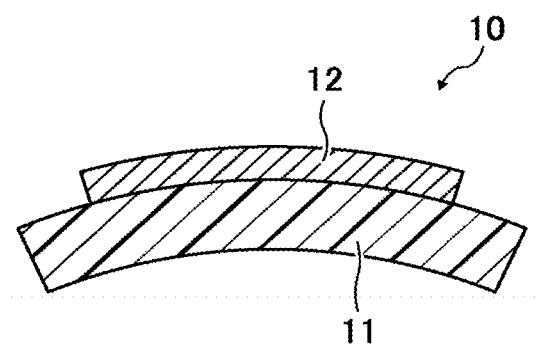
Figure 7C:
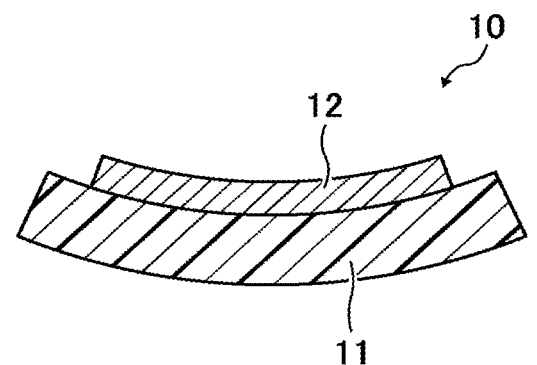

FIGS. 7A to 7C are cross-sectional views of a laminated substrate according to a first example. FIG. 7A illustrates a state in which a curved surface has not been formed, FIG. 7B illustrates a state in which a convex processing has been performed, and FIG. 7C illustrates a state in which a concave processing has been performed. A first laminated substrate 10 is a conductive layer formed substrate containing a resin substrate 11 comprising a thermoplastic resin and a conductive layer 12 on the resin substrate 11. The resin substrate 11 is an example of a support substrate.

Preferably, the surface of the resin substrate 11 has a hardness of 180 MPa or more. Preferably, the conductive layer 12 contains an indium oxide ($In_2O_3$). More preferably, the conductive layer 12 contains an indium oxide ($In_2O_3$) having a crystal peak from (222) plane having an H/W value of from 0.16 to 5.7. The H/W value is obtained by dividing the height H (cps) of the peak obtained by X-ray diffraction (XRD) by the half value width W (°) thereof.

As the material of the resin substrate 11, any known thermoplastic resins can be used. Examples of the material of the resin substrate 11 include, but are not limited to, polycarbonate, polyethylene terephthalate, polyethylene naphthalate acrylic (polymethyl methacrylate), polyvinyl chloride, polyvinylidene chloride, polyvinyl alcohol, polystyrene, styrene acrylonitrile copolymer, styrene butadiene acrylonitrile copolymer, polyethylene, ethylene vinyl acetate copolymer, polypropylene, polyacetal, cellulose acetate, polyamide (nylon), polyurethane, and fluororesin (TEFLON (registered trademark)). In particular, polycarbonate and polyethylene terephthalate are preferable for moldability, transparency, and cost. For the hardness of 180 MPa or more, polyethylene-terephthalate-based materials and polyethylene-naphthalate-based materials are preferable. The thickness of the resin substrate 11 may be, for example, in a range of from 0.03 to 2.0 mm within which it is easy to form a curved surface.

As the material of the conductive layer 12, any known conductive materials can be used, which may be either transparent or opaque. Examples of opaque materials include, but are not limited to, metal materials such as gold (Au), silver (Ag), copper (Cu), aluminum (Al), nickel (Ni), tungsten (W), and molybdenum (Mo). Examples of transparent materials include, but are not limited to, inorganic oxides, carbon (e.g., carbon nanotube (CNT), graphene), metal nanowires, metal grids, and conductive polymers. Depending on the application of the conductive layer 12, the inorganic oxides are particularly preferable because they are dense and have excellent conductivity, transparency (transmittance and haze), and reliability. Examples of the inorganic oxides include, but are not limited to, oxides of indium (In), tin (Sn), zinc (Zn), and aluminum (Al), to which tungsten (W), titanium (Ti), zirconium (Zr), zinc (Zn), antimony (Sb), gallium (Ga), germanium (Ge), and/or fluorine (F) may be added. The thickness of the conductive layer 12 may be adjusted according to the amount of electric current required for the electronic device. When the conductive layer 12 is formed of an inorganic oxide, the thickness thereof is from 50 to 500 nm, preferably 200 nm or less. The reason is that the thicker the conductive layer 12 is, the more damage such as crack is likely to occur during curved surface formation processing. The sheet resistance of the conductive layer 12 may be, for example, 300 Ω/□ or less. The conductive layer 12 may be formed by a vacuum film formation method, such as vacuum deposition, sputtering, ion plating, and chemical vapor deposition (CVD). Of these, sputtering that is capable of high-speed film formation is preferable.

Preferably, the conductive layer 12 contains an indium oxide, particularly an indium oxide having a crystal peak from (222) plane having an H/W value of from 0.16 to 5.7. In XRD, the crystal peak from (222) plane of indium oxide is detected around 2θ≈32 (deg.). When the crystal peak from (222) plane has an H/W value of less than 0.16 or no crystal peak from the (222) plane is detected, crystallinity of the conductive layer 12 is too low so that cracks are likely to occur. When the crystal peak has an H/W value of greater than 5.7, crystallinity is so high that cracks starting from the crystal grain boundary are likely to occur in the conductive layer 12. The conductive layer 12 may further contain a single body or mixture of oxides of tin (Sn), tungsten (W), titanium (Ti), zirconium (Zr), zinc (Zn), aluminum (Al), antimony (Sb), gallium (Ga), and fluorine (F), in addition to indium oxide. These oxides contribute to improvement in carrier density and mobility of indium oxide. The proportion of these oxides in the conductive layer 12 may be, for example, 80% by mass or less. As the oxide contained in the conductive layer 12 in combination with indium oxide, tin oxide and zirconium oxide are particularly preferable for conductivity. The proportion thereof in the conductive layers 12 is particularly preferably 15% by mass or less in total amount.

The conductive layer 12 can be formed by a vacuum film formation method. The H/W value of the crystal peak can be adjusted by adjusting the substrate temperature, the film formation rate, the gas pressure, and the like, during the vacuum film formation. It is also effective for adjusting H/W value to conduct a heat treatment after film formation. Examples of the vacuum film formation method include, but are not limited to, vacuum deposition, sputtering, ion plating, and chemical vapor deposition (CVD). Of these, sputtering that is capable of high-speed film formation is preferable. In sputtering, it is easy to control the H/W value of the crystal peak by adjusting the sputtering power.

The visible light transmittance of the conductive layer 12 can be adjusted by adjusting the thickness and the oxygen ratio of the inorganic oxide such as indium oxide and may be, for example, 70% or more. The conductive layer 12 may contain a transparent conductive material such as carbon having excellent stretchability (e.g., carbon nanotube (CNT), graphene), metal nanowire, metal grid, and conductive polymer as long as the visibility is acceptable. Alternatively, the conductive layer 12 may comprise a composite layer of a layer of such a transparent conductive material and an inorganic oxide layer.

When the laminated substrate 10 is processed by the curved surface forming method according to the first or second embodiment with the conductive layer 12 facing the concave mold side, a 3D curved convex surface is formed on the laminated substrate 10 as illustrated in FIG. 7B. When the laminated substrate 10 is processed by the curved surface forming method according to the first or second embodiment with the resin substrate 11 facing the concave mold side, a 3D curved concave surface is formed on the laminated substrate 10 as illustrated in FIG. 7C.

The conductive layer 12 is formed on the entire surface or a part of the resin substrate 11. As illustrated in FIGS. 7B and 7C, the entire laminated substrate 10 may be processed into a 3D curved surface. Alternatively, only a part of the laminated substrate 10 may be processed into a 3D curved surface.

In the laminated substrate 10, since the conductive layer 12 is directly formed on the resin substrate 11, the surface of the resin substrate 11 preferably has a hardness of 180 MPa or more. Examples of such materials include, but are not limited to, polyethylene-terephthalate-based materials and polyethylene-naphthalate-based materials.

It is preferable that the coefficient of thermal expansion of the resin substrate 11 in the first example, is 0.7% or less. Here, the coefficient of thermal expansion refers to that in the temperature range of from room temperature to the softening temperature (Tg) of the resin substrate. When the coefficient of thermal expansion exceeds 0.7%, strain may excessively occur at the time of forming a curved surface. The coefficient of thermal expansion is measured by a tensile load method according to thermomechanical analysis (TMA).

According to the first example, the surface of the resin substrate 11, which is an example of the support substrate, has an appropriate hardness and the conductive layer 12 contains an indium oxide, so that the laminated substrate has excellent transparency, conductivity, and durability and occurrence of cracks can be suppressed even after the laminated substrate is processed into a 3D curved surface shape after formation of the conductive layer 12.

Second Example of Laminated Substrate

Figure 8A:
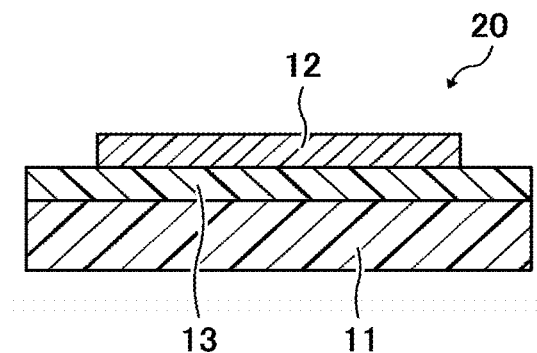
FIGS. 8A to 8C are cross-sectional views of a laminated substrate according to the second example.
Figure 8B:
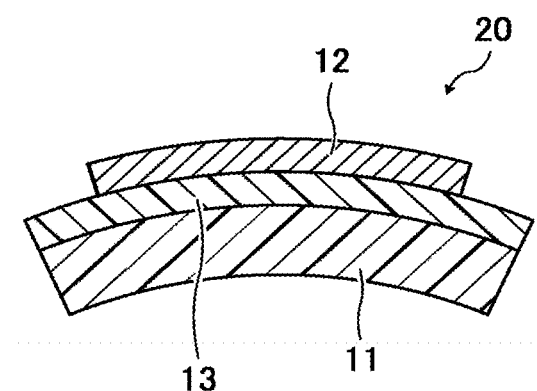
Figure 8C:
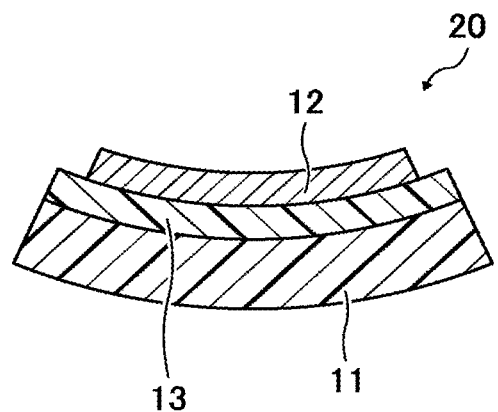

FIGS. 8A to 8C are cross-sectional views of a laminated substrate according to a second example. FIG. 8A illustrates a state in which a curved surface has not been formed, FIG. 8B illustrates a state in which a convex processing has been performed, and FIG. 8C illustrates a state in which a concave processing has been performed. A second laminated substrate 20 is a conductive layer formed substrate containing a resin substrate 11, a base layer 13 on the resin substrate 11, and a conductive layer 12 on the base layer 13. The resin substrate 11 and the base layer 13 are included in the support substrate. Other configurations are the same as those of the first laminated substrate 10.

The base layer 13 is employed, for example, to supplement mechanical properties of the resin substrate 11. For example, when the resin substrate 11 does not have sufficient hardness as the base of the conductive layer 12, the base layer 13 is made harder than the resin substrate 11 to provide a base having sufficient hardness. The base layer 13 may also be employed to adjust the coefficient of thermal expansion. Provision of the base layer 13 makes it possible to expand the range of material selection for the resin substrate 11 and to use a thermoplastic resin having excellent processability for the resin substrate 11. As the material of the base layer 13, for example, ultraviolet (UV) curable resin materials and thermosetting resin materials may be used. More specifically, for example, acrylic resin, urethane resin, and epoxy resin may be used. The hardness of the base layer 13 is preferably 180 MPa or more. Provision of the base layer 13 having a hardness of 180 MPa or more makes it possible to further reduce strain of the conductive layer 12 at the time of forming a curved surface, particularly when the conductive layer 12 is an inorganic oxide layer. The hardness and the coefficient of thermal expansion of the base layer 13 formed of UV curable resin and/or thermosetting resin can be adjusted by adjusting monomer material, cross-linking density, and the amount of reaction initiator. The base layer 13 can be formed by coating the resin substrate 11 with a mixture material of at least an organic monomer material having a reactive group and an initiator and conducting a curing treatment such as UV irradiation or heat treatment. The thickness of the base layer 13 may be, for example, from 0.1 to 10 μm. Examples of the coating method include, but are not limited to, spin coating, casting, micro gravure coating, gravure coating, bar coating, roll coating, wire bar coating, dip coating, slit coating, capillary coating, spray coating, nozzle coating, and various printing methods such as gravure printing, screen printing, flexographic printing, offset printing, reverse printing, and inkjet printing.

When the laminated substrate 20 is processed by the curved surface forming method according to the first or second embodiment with the conductive layer 12 facing the concave mold side, a 3D curved convex surface is formed on the laminated substrate 20 as illustrated in FIG. 8B. When the laminated substrate 20 is processed by the curved surface forming method according to the first or second embodiment with the resin substrate 11 facing the concave mold side, a 3D curved concave surface is formed on the laminated substrate 20 as illustrated in FIG. 8C.

It is preferable that the coefficient of thermal expansion of the support substrate, i.e., the laminated structure of the resin substrate 11 and the base layer 13, is 0.7% or less. Here, the coefficient of thermal expansion refers to that in the temperature range of from room temperature to the softening temperature (Tg) of the resin substrate. When the coefficient of thermal expansion exceeds 0.7%, strain may excessively occur at the time of forming a curved surface. The coefficient of thermal expansion is measured by a tensile load method according to TMA.

According to the second example, the surface of the laminated structure of the resin substrate 11 and the base layer 13, which is an example of the support substrate, has an appropriate hardness and the conductive layer 12 contains an indium oxide, so that the laminated substrate has excellent transparency, conductivity, and durability and occurrence of cracks can be suppressed even after the laminated substrate is processed into a 3D curved surface shape after formation of the conductive layer 12.

Third Example of Laminated Substrate

Figure 9A:
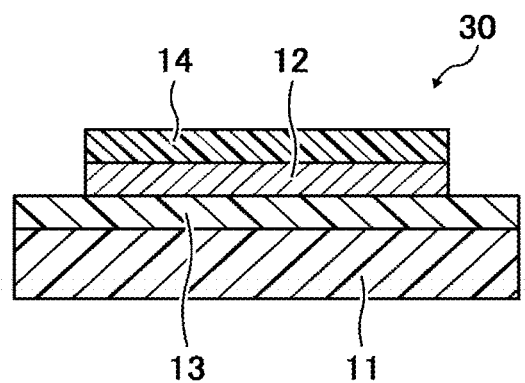
FIGS. 9A to 9C are cross-sectional views of a laminated substrate according to the third example.
Figure 9B:
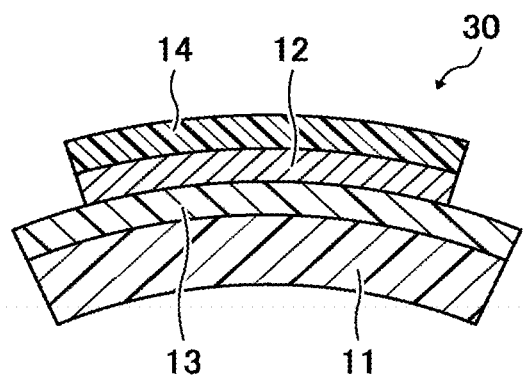
Figure 9C:
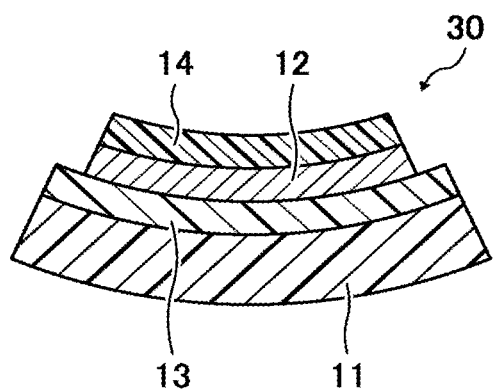

FIGS. 9A to 9C are cross-sectional views of a laminated substrate according to a third example. FIG. 9A illustrates a state in which a curved surface has not been formed, FIG. 9B illustrates a state in which a convex processing has been performed, and FIG. 9C illustrates a state in which a concave processing has been performed. The third laminated substrate 30 is an organic electronic device substrate having an organic electronic material layer 14 on the conductive layer 12. Other configurations are the same as those of the second laminated substrate 20.

The organic electronic material layer 14 is composed of either a single layer or stacked layers. The organic electronic material layer 14 develops functions, such as color development, light emission, polarization, and deformation, upon application of electricity. Conventional organic electronic material layers, such as electrochromic, electroluminescence, chemical luminescence, electrophoretic, electrowetting, liquid crystal, and piezoelectric layers, can be employed as the organic electronic material layer 14. Inorganic materials such as inorganic nanoparticles may be mixed in the organic electronic material layer 14. The total thickness of the organic electronic material layer 14 is generally 50 μm or less. Examples of the coating method include, but are not limited to, spin coating, casting, micro gravure coating, gravure coating, bar coating, roll coating, wire bar coating, dip coating, slit coating, capillary coating, spray coating, nozzle coating, and various printing methods such as gravure printing, screen printing, flexographic printing, offset printing, reverse printing, and inkjet printing.

When the laminated substrate 30 is processed by the curved surface forming method according to the first or second embodiment with the organic electronic material layer 14 facing the concave mold side, a 3D curved convex surface is formed on the laminated substrate 30 as illustrated in FIG. 9B. When the laminated substrate 30 is processed by the curved surface forming method according to the first or second embodiment with the resin substrate 11 facing the concave mold side, a 3D curved concave surface is formed on the laminated substrate 30 as illustrated in FIG. 9C. The laminated substrate 30 having the 3D curved surface can be used, for example, as an organic electronic device substrate. Thus, an organic electronic device substrate having a 3D curved surface can be obtained with excellent productivity.

According to the third example, the surface of the support substrate has an appropriate hardness and the conductive layer 12 contains an indium oxide, so that the laminated substrate has excellent transparency, conductivity, and durability and occurrence of cracks can be suppressed even after the laminated substrate is processed into a 3D curved surface after formation of the conductive layer 12 and the organic electronic material layer 14.

Fourth Example of Laminated Substrate

Figure 10A:
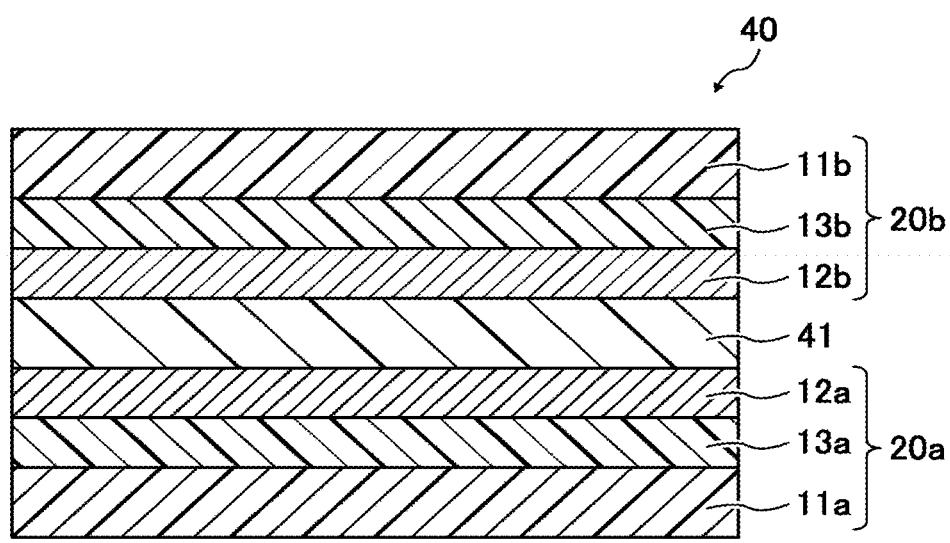
FIGS. 10A and 10B are cross-sectional views of a laminated substrate according to the fourth example.
Figure 10B:
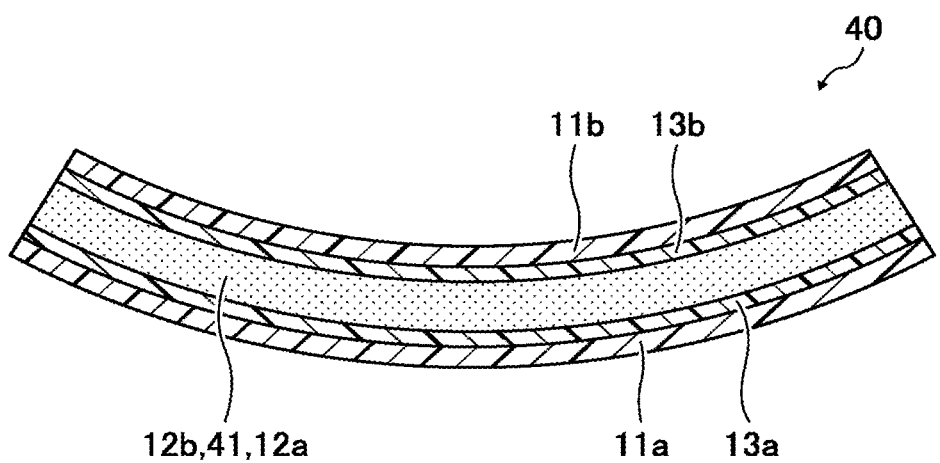

FIGS. 10A and 10B are cross-sectional views of a laminated substrate according to a fourth example. FIG. 10A illustrates a state in which a curved surface has not been formed and FIG. 10B illustrates a state in which a curved surface processing has been performed. The fourth laminated substrate 40 is a conductive layer formed substrate containing a laminated substrate 20a and a laminated substrate 20b each having the same structure as the laminated substrate 20. The laminated substrate 20a contains a resin substrate 11a, a base layer 13a, and a conductive layer 12a. The laminated substrate 20b contains a resin substrate 11b, a base layer 13b, and a conductive layer 12b. The laminated substrate 40 has a double-sided adhesive layer 41 for bonding the conductive layer 12a and the conductive layer 12b to each other. That is, the laminated substrate 40 has a structure in which the laminated substrate 20a and the laminated substrate 20b are bonded to each other via the double-sided adhesive layer 41. The resin substrates 11a and 11b, the conductive layers 12a and 12b, and the base layers 13a and 13b have the same structures as the resin substrate 11, the conductive layer 12, and the base layer 13, respectively. The resin substrate 11a and the base layer 13a are included in one support substrate, and the resin substrate 11b and the base layer 13b are included in another support substrate. The double-sided adhesive layer 41 may comprise, for example, an optical clear adhesive (OCA) tape.

The laminated substrate 40 illustrated in FIG. 10A can be obtained by, for example, bonding the laminated substrate 20a and the laminated substrate 20b by the double-sided adhesive layer 41. A conventional bonding apparatus can be used for this bonding. When the laminated substrate 40 is processed by the curved surface forming method according to the first or second embodiment with the laminated substrate 20a facing the concave mold side, a 3D curved surface is formed on the laminated substrate 40 as illustrated in FIG. 10B. The laminated substrate 40 having the curved surface can be used, for example, as a conductive layer formed substrate having a bonded structure.

Generally, in order to bond two curved substrates, the curved substrates are required to be controlled in curvature with high accuracy and a special bonding apparatus with high precision is required. On the other hand, according to the first or second embodiment, the occurrence of cracks can be suppressed even when the 3D curved surface processing is performed after formation and bonding of the layers, so that the laminated substrate 40 having a bonded structure and a 3D curved surface can be obtained with a conventional bonding apparatus for bonding flat-plate-like substrates. That is, the laminated substrate 40 usable as a conductive layer formed substrate can be obtained with low cost and excellent productivity.

Preferably, the double-sided adhesive layer 41 comprises an OCA tape for optical characteristics and uniformity of film thickness. General adhesives (e.g., light curing type, thermosetting type) can also be used. The thickness of the double-sided adhesive layer 41 may be, for example, 20 to 200 μm.

Fifth Example of Laminated Substrate

Figure 11A:
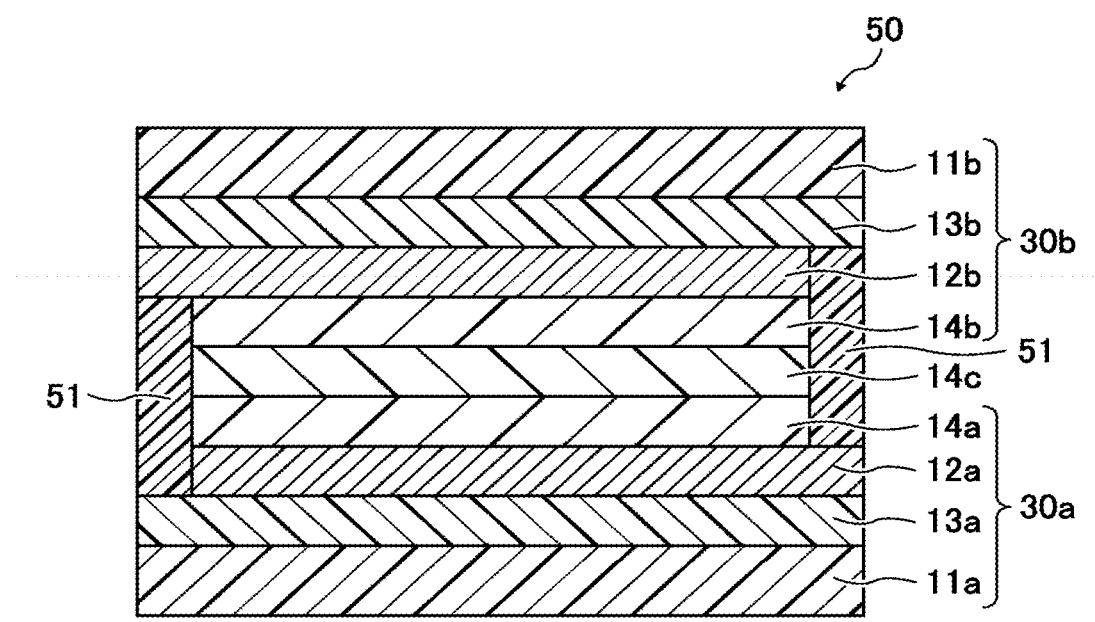
FIGS. 11A and 11B are cross-sectional views of a laminated substrate according to the fifth example.
Figure 11B:
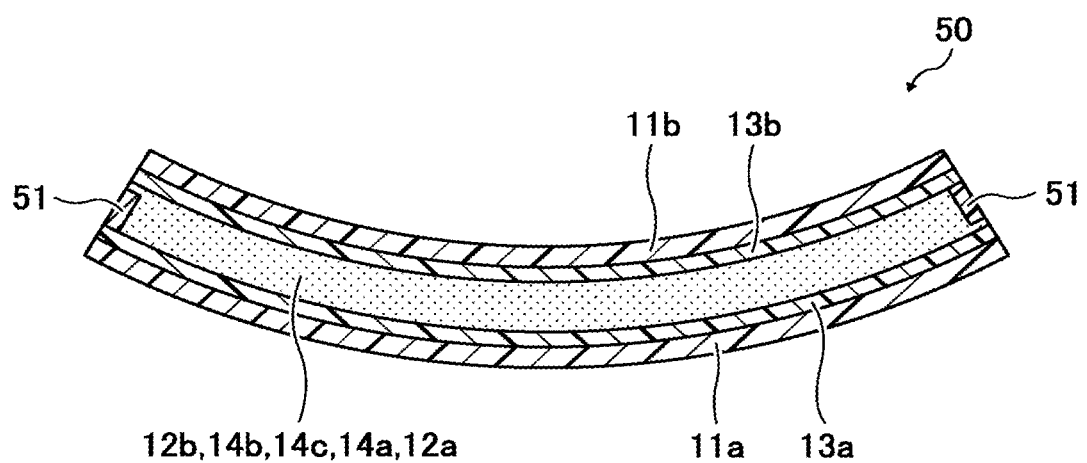
Figure 12A:
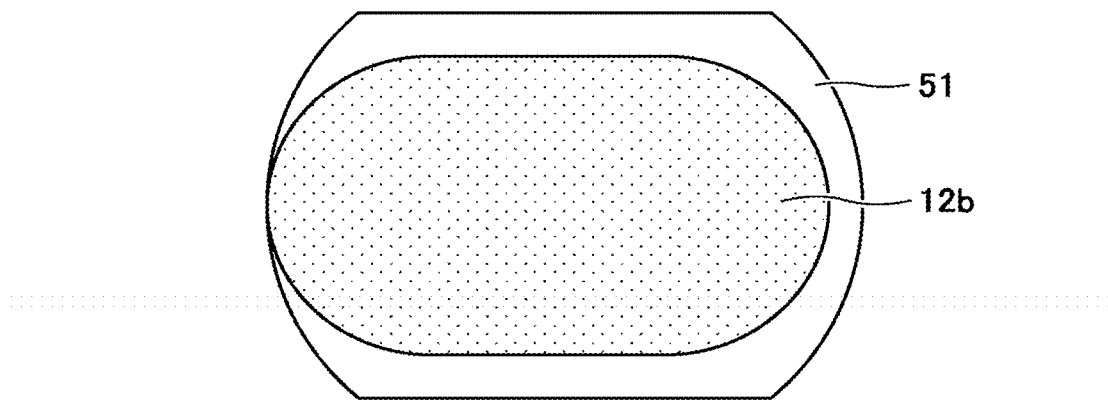
FIGS. 12A to 12C are illustrations for explaining the positional relationship between the layers in the laminated substrate according to the fifth embodiment.
Figure 12B:
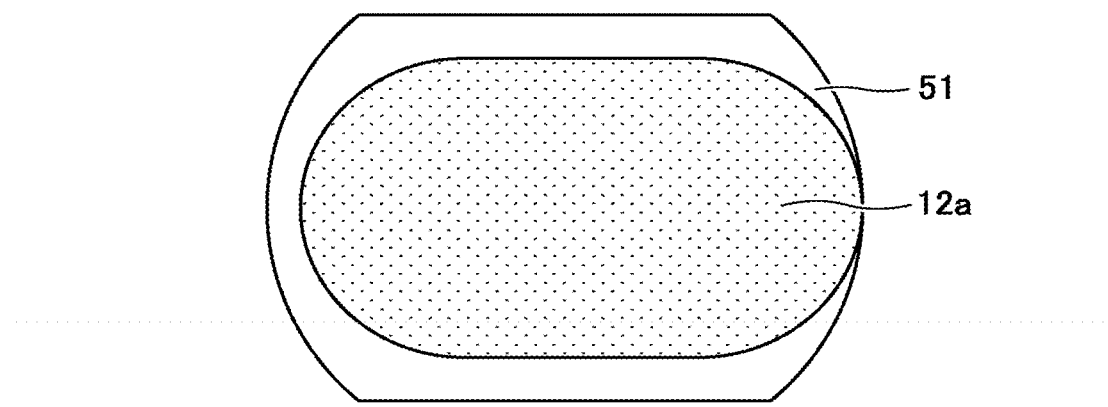
Figure 12C:
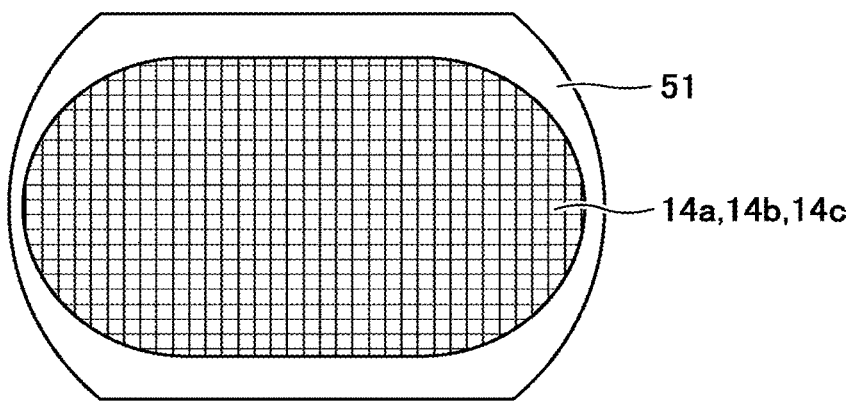

FIGS. 11A and 11B are cross-sectional views of a laminated substrate according to a fifth example. FIG. 11A illustrates a state in which a curved surface has not been formed and FIG. 11B illustrates a state in which a curved surface processing has been performed. The fifth laminated substrate 50 is an organic electronic device substrate containing a laminated substrate 30a and a laminated substrate 30b each having the same structure as the laminated substrate 30. The laminated substrate 30a contains a resin substrate 11a, a base layer 13a, a conductive layer 12a, and an organic electronic material layer 14a. The laminated substrate 30b contains a resin substrate 11b, a base layer 13b, a conductive layer 12b, and an organic electronic material layer 14b. The laminated substrate 50 has an organic electronic material layer 14c sandwiched between the organic electronic material layer 14a and the organic electronic material layer 14b. That is, the laminated substrate 50 has a structure in which the laminated substrate 30a and the laminated substrate 30b sandwich the organic electronic material layer 14c. The resin substrates 11a and 11b, the conductive layers 12a and 12b, and the base layers 13a and 13b have the same structures as the resin substrate 11, the conductive layer 12, and the base layer 13, respectively. Furthermore, for example, the organic electronic material layer 14a, the organic electronic material layer 14b, and the organic electronic material layer 14c may be an oxidized electrochromic (EC) layer, a reduced EC layer, and a solid electrolyte layer, respectively. The laminated substrate 50 has a protective layer 51 that covers and protects the conductive layer 12a, the organic electronic material layer 14a, the organic electronic material layer 14c, the organic electronic material layer 14b, and the conductive layer 12b from the sides thereof. A part of the conductive layer 12a and a part of the conductive layer 12b are exposed as lead portions from the protective layer 51. FIGS. 12A to 12C are illustrations for explaining the positional relationship between the protective layer and each layer covered with the protective layer in a plan view. FIG. 12A illustrates the positional relationship between the protective layer 51 and the conductive layer 12b, FIG. 12B illustrates the positional relationship between the protective layer 51 and the conductive layer 12a, and FIG. 12C illustrates the positional relationship between the protective layer 51 and the organic electronic material layers 14b, 14c, and 14a.

The protective layer 51 is formed so as to physically and chemically protect the side surface portion of the laminated substrate 50 (organic electronic device substrate). The protective layer 51 can be formed by, for example, applying an UV curable or thermosetting insulating resin so as to cover the side surface and/or the top surface of the laminated substrate and then curing the resin. The thickness of the protective layer 51 is not particularly limited and may be appropriately selected depending on the purpose, and is preferably from 0.5 to 10 μm.

The laminated substrate 50 illustrated in FIG. 11A can be obtained by, for example, bonding the laminated substrate 30a and the laminated substrate 30b with the organic electronic material layer 14c interposed therebetween and thereafter forming the protective layer 51. A conventional bonding apparatus can be used for this bonding. When the laminated substrate 50 is processed by the curved surface forming method according to the first or second embodiment with the laminated substrate 30a facing the concave mold side, a 3D curved surface is formed on the laminated substrate 50 as illustrated in FIG. 11B. The laminated substrate 50 having the curved surface can be used, for example, as an organic electronic device substrate having a bonded structure.

According to the first or second embodiment, the laminated substrate 50 having a bonded structure and a 3D curved surface can be obtained with a conventional bonding apparatus for bonding flat-plate-like substrates. That is, the laminated substrate 50 usable as an organic electronic device substrate can be obtained with low cost and excellent productivity.

In applications where color development of the organic electronic material layers 14a or 14c is visually recognized from only one of the resin substrate 11a side or the resin substrate 11b side, the resin substrate on the side of visual recognition is transparent while the other resin substrate is not necessarily transparent.

Sixth Example of Laminated Substrate

Figure 13A:
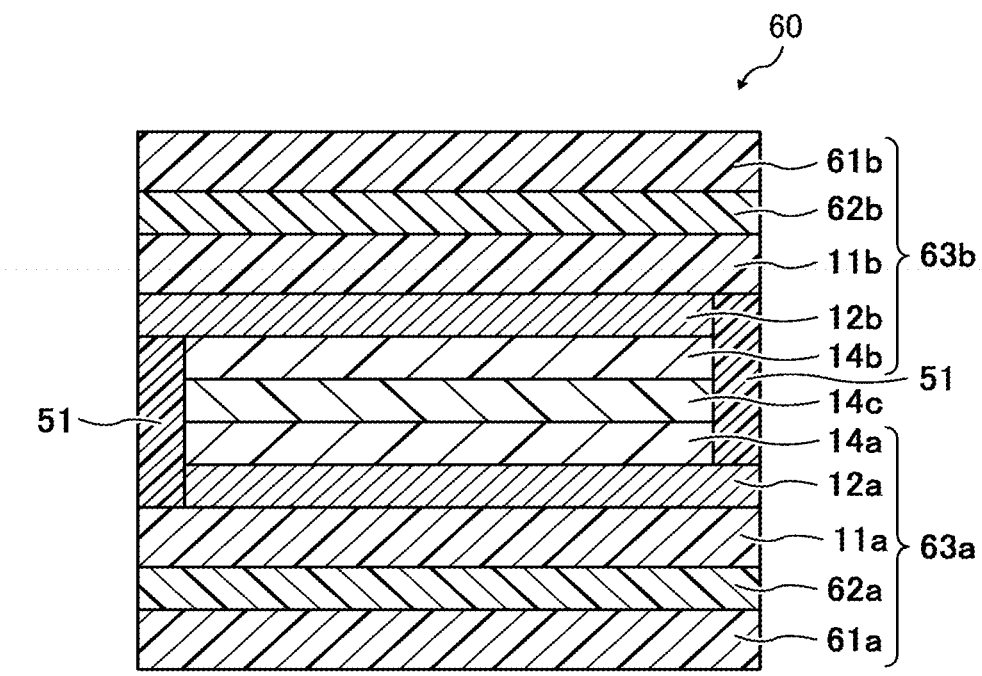
FIGS. 13A and 13B are cross-sectional views of a laminated substrate according to the sixth example.
Figure 13B:
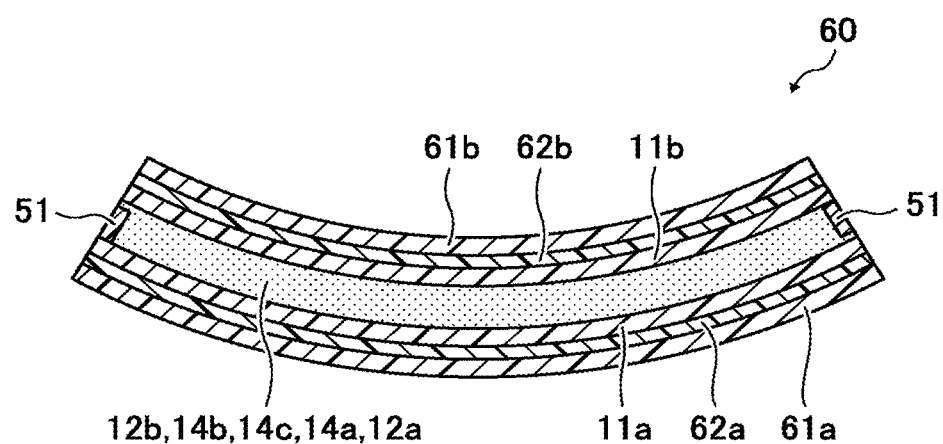

FIGS. 13A and 13B are cross-sectional views of a laminated substrate according to a sixth example. FIG. 13A illustrates a state in which a curved surface has not been formed and FIG. 13B illustrates a state in which a curved surface processing has been performed. The sixth laminated substrate 60 is an organic electronic device substrate containing a laminated substrate 63a and a laminated substrate 63b. The laminated substrate 63a contains a resin substrate 11a, a conductive layer 12a, and an organic electronic material layer 14a. The laminated substrate 63b contains a resin substrate 11b, a conductive layer 12b, and an organic electronic material layer 14b. The laminated substrate 63a further contains a processing resin substrate 61a and a double-sided adhesive layer 62a. The processing resin substrate 61a and the resin substrate 11a are adhered to each other by the double-sided adhesive layer 62a. The laminated substrate 63b further contains a processing resin substrate 61b and a double-sided adhesive layer 62b. The processing resin substrate 61b and the resin substrate 11b are adhered to each other by the double-sided adhesive layer 62b. The laminated substrate 60 has an organic electronic material layer 14c sandwiched between the organic electronic material layer 14a and the organic electronic material layer 14b. That is, the laminated substrate 60 has a structure in which the laminated substrate 63a and the laminated substrate 63b sandwich the organic electronic material layer 14c. Like the laminated substrate 50, the laminated substrate 60 has a protective layer 51. A part of the conductive layer 12a and a part of the conductive layer 12b are exposed as lead portions from the protective layer 51.

The double-sided adhesive layers 62a and 62b each have the same configuration as the double-sided adhesive layer 41. The processing resin substrates 61a and 61b are adhered to the outer side of the resin substrates 11a and 11b by the double-sided adhesive layers 62a and 62b, respectively, to improve accuracy of curved surface processing. Materials usable for the resin substrates 11a and 11b can be used for the processing resin substrates 61a and 61b. The thickness of the processing resin substrates 61a and 61b may be the same level as the thickness of the resin substrates 11a and 11b. On the other hand, the modulus of elasticity of the processing resin substrates 61a and 61b is preferably smaller than that of the resin substrates 11a and 11b. When the modulus of elasticity of the processing resin substrates 61a and 61b is larger than that of the resin substrates 11a and 11b, the neutral axis for the bending processing may be far from the central portion of the film where functional layers such as the conductive layers 12a and 12b and the organic electronic material layers 14a to 14c are formed. In such a case, it is likely that strain of the conductive layers 12a and 12b containing an inorganic oxide, etc., becomes large. Examples of particularly preferable material for the processing resin substrates 61a and 61b include polycarbonate that has excellent transparency and processability.

The laminated substrate 60 illustrated in FIG. 13A can be obtained by, for example, bonding the laminated substrate 63a and the laminated substrate 63b with the organic electronic material layer 14c interposed therebetween and thereafter forming the protective layer 51. A conventional bonding apparatus can be used for this bonding. When the laminated substrate 60 is processed by the curved surface forming method according to the first or second embodiment with the laminated substrate 63a facing the concave mold side, a 3D curved surface is formed on the laminated substrate 60 as illustrated in FIG. 13B. The laminated substrate 60 having the curved surface can be used, for example, as an organic electronic device substrate having a bonded structure.

According to the first or second embodiment, the laminated substrate 60 having a bonded structure and a 3D curved surface can be obtained with a conventional bonding apparatus for bonding flat-plate-like substrates. That is, the laminated substrate 60 usable as an organic electronic device substrate can be obtained with low cost and excellent productivity. In particular, since the laminated substrate 60 contains the processing resin substrates 61a and 61b, by selecting materials having excellent processability for the processing resin substrates 61a and 61b, the entire laminated substrate 60 can be further improved in processability and can be processed with excellent curved surface accuracy.

After the laminated substrate 60 is processed into a 3D curved surface shape, the double-sided adhesive layers 62a and 62b may be detached off from the resin substrates 11a and 11b, respectively. In this case, the processing resin substrates 61a and 61b are removed and the fifth laminated substrate 50 is obtained.

Seventh Example of Laminated Substrate

Figure 14A:
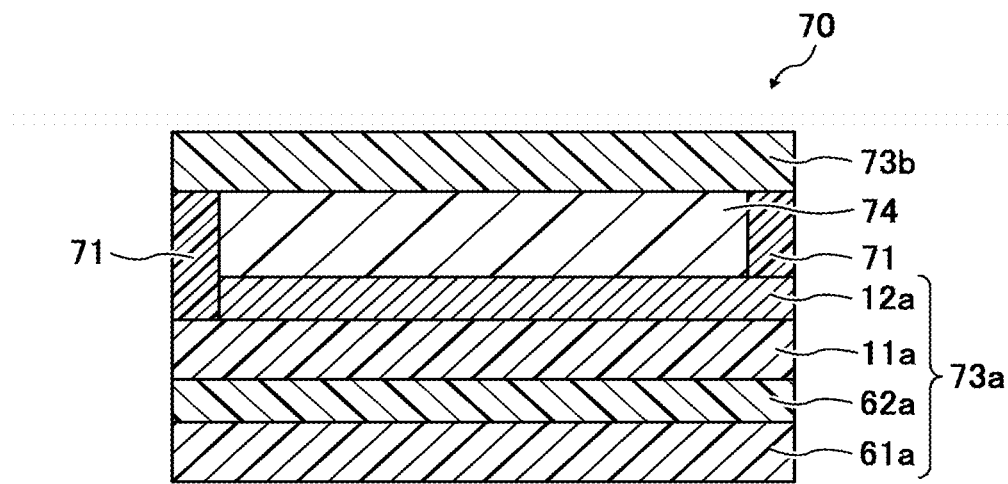
FIGS. 14A and 14B are cross-sectional views of a laminated substrate according to the seventh example.
Figure 14B:
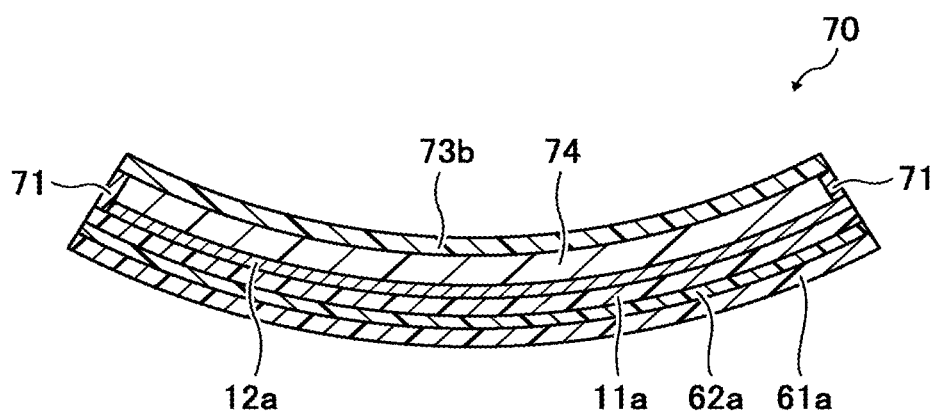

FIGS. 14A and 14B are cross-sectional views of a laminated substrate according to a seventh example. FIG. 14A illustrates a state in which a curved surface has not been formed and FIG. 14B illustrates a state in which a curved surface processing has been performed. The seventh laminated substrate 70 is an organic electronic device substrate containing a laminated substrate 73a and a thin film transistor (TFT) substrate 73b. The TFT substrate 73b contains a substrate and electrodes arranged in a matrix on the substrate. The electrodes are included in a conductive layer. The conductive layer included in the TFT substrate 73b is divided into a matrix. The laminated substrate 70 has an organic electronic material layer 74 sandwiched between the conductive layer 12a and the TFT substrate 73b. That is, the laminated substrate 70 has a structure in which the laminated substrate 73a and the TFT substrate 73b sandwich the organic electronic material layer 74. The organic electronic material layer 74 may be, for example, a microcapsule electrophoretic layer. The laminated substrate 70 has a protective layer 71 that covers and protects the conductive layer 12a and the organic electronic material layer 74 from the sides thereof. A part of the conductive layer 12a is exposed as a lead portion from the protective layer 71. Similar to the sixth example, the processing resin substrate 61a is adhered to the outer side of the resin substrate 11a by the double-sided adhesive layer 62a.

Eighth Example of Laminated Substrate

Figure 15A:
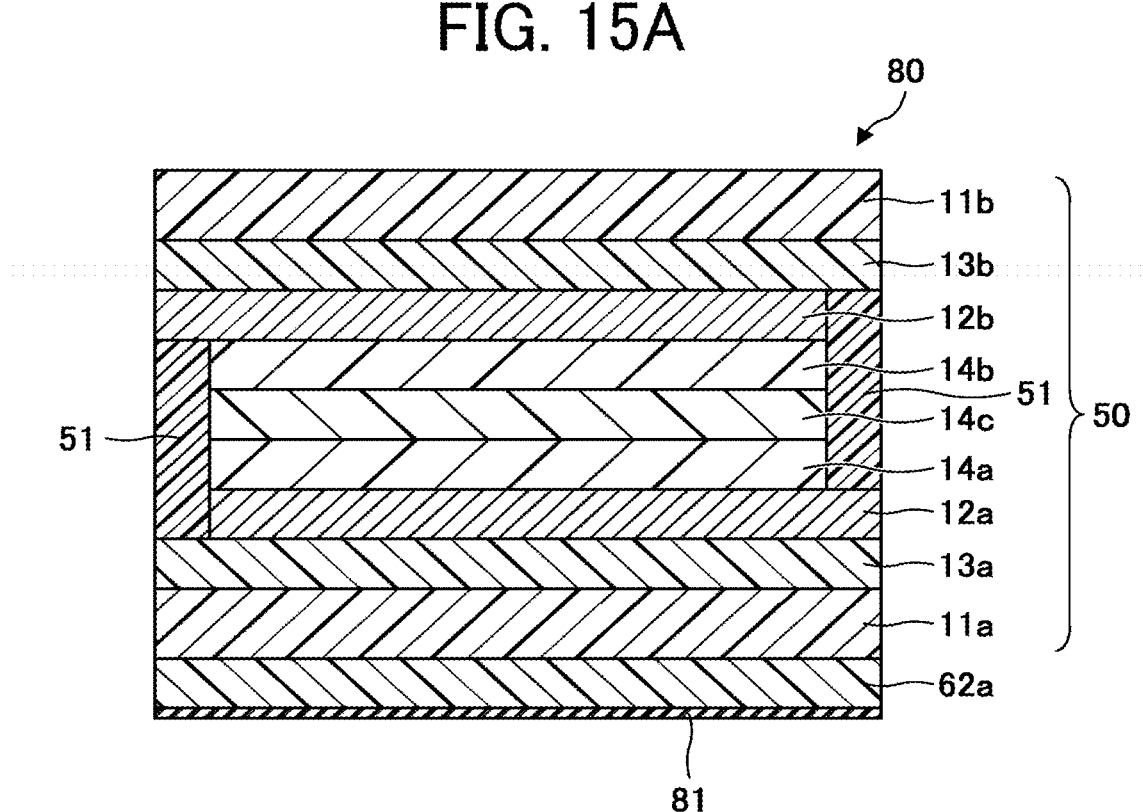
FIGS. 15A and 15B are cross-sectional views of a laminated substrate according to the eighth example.
Figure 15B:
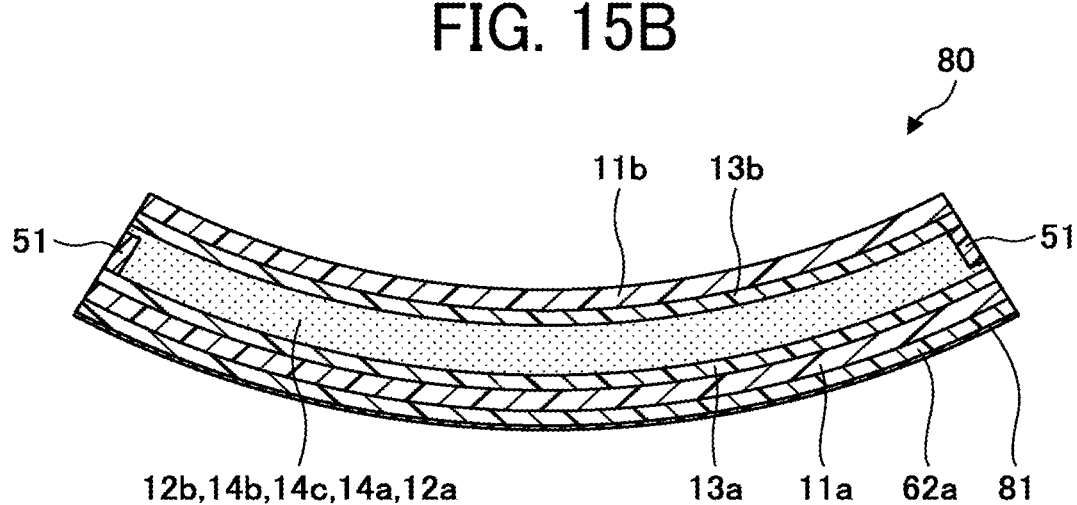

FIGS. 15A and 15B are cross-sectional views of a laminated substrate according to an eighth example. FIG. 15A illustrates a state in which a curved surface has not been formed and FIG. 15B illustrates a state in which a curved surface processing has been performed. The eighth laminated substrate 80 is an organic electronic device substrate containing the fifth laminated substrate 50 and the double-sided adhesive layer 62a. One surface of the double-sided adhesive layer 62a is adhered to the resin substrate 11a, and the other surface of the double-sided adhesive layer 62a is covered with a protective sheet 81 that is detachable from this surface. The protective sheet 81 protects the double-sided adhesive layer 62a and improves handleability of the laminated substrate 80. As the protective sheet 81, for example, an ethylene film such as a polyethylene film and a polypropylene film may be used. The material of the protective sheet 81 can be selected in view of the temperature at the time of forming a curved surface. The thickness of the protective sheet 81 may be, for example, 10 to 500 μm. As the double-sided adhesive layer 62a and the protective sheet 81, a release film or release paper may be used.

The laminated substrate 80 illustrated in FIG. 15A can be obtained by, for example, bonding the double-sided adhesive layer 62a having the protective sheet 81 on one side thereof to the resin substrate 11a of the laminated substrate 50. When the laminated substrate 80 is processed by the curved surface forming method according to the first or second embodiment with the protective sheet 81 facing the concave mold side, a 3D curved surface is formed on the laminated substrate 80 as illustrated in FIG. 15B. The laminated substrate 80 having the curved surface can be used, for example, as an organic electronic device substrate having a bonded structure. Further, according to the present embodiment, the protective sheet 81 can be detached so that the double-sided adhesive layer 62a can be attached to a desired curved surface portion of another substrate. Therefore, the laminated substrate 80 can also be bonded to a portion where the curved surface cannot be formed simultaneously with the laminated substrate 80.

The protective sheet 81 may also be used in place of the processing resin substrates 61a and 61b in the laminated substrate 60.

As a 3D curved surface is formed on a bonded structure in which flat-plate-like organic electronic device substrates are bonded, conventional bonding devices can be utilized as they are. Thus, an organic electronic device substrate, such as an electrochromic substrate, having a bonded structure at excellent productivity. Similarly, a transparent conductive substrate having a bonded structure can also be provided at excellent productivity.

EXAMPLES

Further understanding of the present disclosure can be obtained by reference to certain specific examples provided herein below for the purpose of illustration only and are not intended to be limiting.

TABLE A1

| | | Base Layer | | | Conductive Layer | | | | Results of Bending Processing | | | |
| | | | | | | | | | Radius | | | |
| Examples/ Comparative Examples | Laminated Substrate No. | Resin Substrate Material | Material | Hardness $H_{IT}$ (MPa) | Material | Thickness (nm) | Transmittance (%) | Sheet Resistance (Ω/□) | Processing Equipment | of Curvature (mm) | Mold Temperature (° C.) | Convex Processing | Concave Processing |
|---|---|---|---|---|---|---|---|---|---|---|---|---|---|
| Example A1 | Laminated Substrate 10 | PC | None | | APC | 100 | | 10 or less | Apparatus 100 (FIG. 1) | 131 | 146 | Good | Good |

TABLE A1-continued

| Examples/ Comparative Examples | Laminated Substrate No. | Resin Substrate Material | Base Layer Material | Base Layer Hardness $H_{IT}$ (MPa) | Conductive Layer Material | Conductive Layer Thickness (nm) | Conductive Layer Transmittance (%) | Conductive Layer Sheet Resistance ($\Omega/\square$) | Processing Equipment | Results of Bending Processing Radius of Curvature (mm) | Mold Temperature (°C.) | Convex Processing | Concave Processing |
|---|---|---|---|---|---|---|---|---|---|---|---|---|---|
| Example A2 | Laminated Substrate 20 | PC | Acrylic 1 | 680 | ITO | 110 | 83 | 49 | Apparatus 100 (FIG. 3) | 131 | 146 | Good | Good |
| Example A3 | Laminated Substrate 20 | PC | Acrylic 2 | 440 | ITO | 110 | 83 | 49 | Apparatus 100 (FIG. 3) | 131 | 146 | Good | Good |
| Example A4 | Laminated Substrate 20 | PC | Acrylic 3 | 400 | ITO | 110 | 83 | 49 | Apparatus 100 (FIG. 3) | 131 | 146 | Poor | Good |
| Example A5 | Laminated Substrate 20 | PC | Acrylic 4 | 180 | ITO | 55 | 80 | 71 | Apparatus 100 (FIG. 3) | 131 | 146 | Poor | Good |
| Example A6 | Laminated Substrate 20 | PC | Acrylic 2 | 440 | In$_2$O$_3$/ZrO$_2$ | 110 | 81 | 74 | Apparatus 100 (FIG. 3) | 131 | 146 | Good | Good |
| Example A7 | Laminated Substrate 20 | PC | Acrylic 2 | 440 | In$_2$O$_3$/ZrO$_2$ | 110 | 81 | 74 | Apparatus 100 (FIG. 3) | 86 | 146 | Good | Good |
| Example A8 | Laminated Substrate 20 | PC | Acrylic 2 | 440 | In$_2$O$_3$/ZrO$_2$ | 220 | 76 | 65 | Apparatus 100 (FIG. 3) | 131 | 146 | Good | Good |
| Example A9 | Laminated Substrate 20 | PC | Acrylic 1 | 680 | ITO | 110 | 83 | 49 | Apparatus 200 (FIG. 4) | 131 | 141 | Good | Good |
| Example A10 | Laminated Substrate 30 | PC | Acrylic 1 | 680 | ITO | 110 | 83 | 49 | Apparatus 100 (FIG. 3) | 131 | 146 | Good | Good |
| Example A11 | Laminated Substrate 40 | PC | Acrylic 1 | 680 | ITO | 110 | 83 | 49 | Apparatus 100 (FIG. 3) | 131 | 146 | Good | Good |
| Example A12 | Laminated Substrate 50 | PC | Acrylic 1 | 680 | ITO | 110 | 83 | 49 | Apparatus 100 (FIG. 3) | 131 | 146 | Good | Good |
| Example A13 | Laminated Substrate 60 | PET | None | 180 | ITO | 110 | 83 | 49 | Apparatus 100 (FIG. 3) | 131 | 146 | Good | Good |
| Example A14 | Laminated Substrate 70 | Commercially-available Electronic Paper | | | | | | | Apparatus 100 (FIG. 1) | 131 | 146 | Not Performed | Good |
| Example A15 | Laminated Substrate 80 | PC | Acrylic 1 | 680 | ITO | 110 | 83 | 49 | Apparatus 100 (FIG. 3) | 131 | 146 | Good | Good |
| Comparative Example A1 | Laminated Substrate 20 | PC | Acrylic 1 | 680 | ITO | 110 | 83 | 49 | Vacuum Forming Apparatus | 131 | 146 | Poor | Poor |

In Example A1, a conductive layer formed substrate having the same configuration as the first laminated substrate 10 was used. As the resin substrate, a plane-oriented polycarbonate (PC) sheet substrate having a diameter of 100 mm and a thickness of 0.3 mm was prepared. A conductive layer was formed thereon by sputtering. The hardness (HIT) of the polycarbonate sheet was 150 MPa when measured with a nanoindenter (PICODENTOR HM500 manufactured by FISCHER INSTRUMENTS K.K.). The conductive layer was formed using an AgPdCu alloy (APC) target manufactured by Furuya Metal Co., Ltd. The sputtering power at the time of film formation was set to 3 kW, and the thickness of the conductive layer was adjusted to 100 nm by controlling the film formation time. As a sputtering equipment, SOLARIS from Oerlikon was used. The thickness of the conductive layer was measured by Alpha-Step D-500 manufactured by KLA-Tencor Corporation. The sheet resistance of the conductive layer was measured using a 4-terminal resistance measuring instrument LORESTA GP manufactured by Mitsubishi Chemical Analytech Co., Ltd. As a result, the sheet resistance of the conductive layer was 10 m$\Omega/\square$ or less.

The conductive layer formed substrate was thereafter processed into a 3D curved surface shape using the curved surface forming apparatus 100. In this processing, a spherical concave mold having a radius of curvature of 131 mm and a diameter of 200 mm was prepared, and a silicone rubber sheet having a thickness of 0.3 mm was used for the elastic sheet. The spherical concave mold is made of an aluminum alloy according to JIS A7075. After the temperature of the concave mold was adjusted to 146° C., the conductive layer formed substrate was placed on the elastic sheet, and the elastic sheet and the conductive layer formed substrate were brought into close contact with the concave mold for 90 seconds by pump suction to undergo plastic deformation. The air exhausted from the pump suction hole was thereafter returned to the atmospheric pressure, whereby the elastic sheet and the conductive layer formed substrate were released from the mold, thus obtaining the conductive layer formed substrate having a spherical 3D curved surface. Both of convex processing and concave processing were performed as the bending processing.

With respect to the conductive layer after the processing, presence or absence of breakage (crack) was confirmed by observation with scattering diffracted light and observation using a scanning electron microscope (SEM). As a result, no crack occurred in both the convex processing and the concave processing.

Examples A2 to A5

In Examples A2 to A5, a conductive layer formed substrate having the same configuration as the second laminated substrate 20 was used. As the resin substrate, a 156-mm-square plane-oriented polycarbonate sheet substrate having a thickness of 0.3 mm was prepared. A base layer was formed thereon. As the material of the base layer, four types of UV-curable acrylic resins whose cross-linking densities were adjusted, manufactured by Meihan Shinku Kogyo Co., Ltd., were used. In Examples A2, A3, A4, and A5, UC1-088 (acrylic 1), UC1-095 (acrylic 2), UC1-077 (acrylic 3), and UC1-090 (acrylic 4) were respectively used. The thickness of the base layer was 9 µm in Examples A2 and A5, and the thickness of the base layer was 5 µm in Examples A3 and A4. The hardness (HIT) of the base layer was measured with a nanoindenter (PICODENTOR HM500 manufactured by FISCHER INSTRUMENTS K.K.). Next, a conductive layer of an inorganic oxide was formed on the base layer by sputtering using an ITO target comprising 90% by mass of $In_2O_3$ and 10% by mass of $SnO_2$. The sputtering power at the time of film formation was set to 6.5 kW, the oxygen/argon (Ar) flow rate was set to 3.6%, and the thickness of the conductive layer was adjusted by controlling the film formation time. As a sputtering equipment, SOLARIS from Oerlikon was used. The thickness of the conductive layer was measured by Alpha-Step D-500 manufactured by KLA-Tencor Corporation. The sheet resistance of the conductive layer was measured using a 4-terminal resistance measuring instrument LORESTA GP manufactured by Mitsubishi Chemical Analytech Co., Ltd. In this measurement, the transmittance at 550 nm was measured using a spectrophotometer UH 4150 manufactured by Hitachi High-Tech Science Corporation. The results are presented in Table A1.

Figure 16:
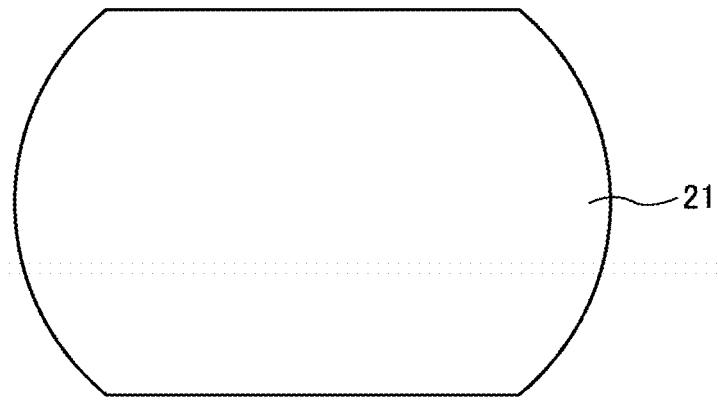
FIG. 16 is a plan view of a laminated substrate according to an embodiment of the present invention having a planar shape.

Next, the conductive layer formed substrate was processed into a planar shape as illustrated in FIG. 16 using a laser beam. The outline of the conductive layer formed substrate includes two straight portions parallel to each other and two arc-like curved portions each connecting both one ends of the straight portions. The distance between the straight portions is 54.5 mm and the distance between the curved portions (corresponding to the diameter of the circular arc) is 75.5 mm. The conductive layer formed substrate was thereafter processed into a 3D curved surface shape using the curved surface forming apparatus 100 illustrated in FIG. 3 equipped with the convex mold. In this processing, a spherical concave mold having a radius of curvature of 131 mm and a diameter of 200 mm and a convex mold paired with the spherical concave mold were prepared, and a silicone rubber sheet having a thickness of 0.3 mm was used for each of the substrate holding rubber sheet and the elastic sheet. The spherical concave mold and the convex mold are made of an aluminum alloy according to JIS A7075. After the temperature of the concave mold was adjusted to 146° C., the conductive layer formed substrate was placed on the elastic sheet, and the elastic sheet and the conductive layer formed substrate were brought into close contact with the concave mold for 60 seconds by pump suction to undergo plastic deformation. Subsequently, the convex mold controlled to have a temperature of 146° C. was lowered to conduct pressing for 90 seconds. The air exhausted from the pump suction hole was thereafter returned to the atmospheric pressure, whereby the elastic sheet and the conductive layer forming substrate were released from the mold, thus obtaining the conductive layer forming substrate on which a spherical 3D curved surface was formed. Both of convex processing and concave processing were performed as the bending processing.

Figure 17A:
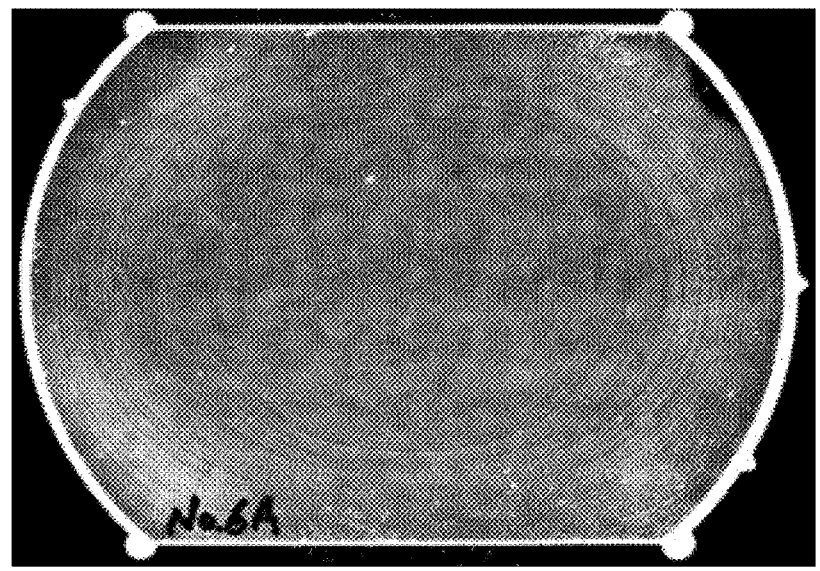
FIGS. 17A and 17B are illustrations of cracks observed in a conductive layer.
Figure 17B:
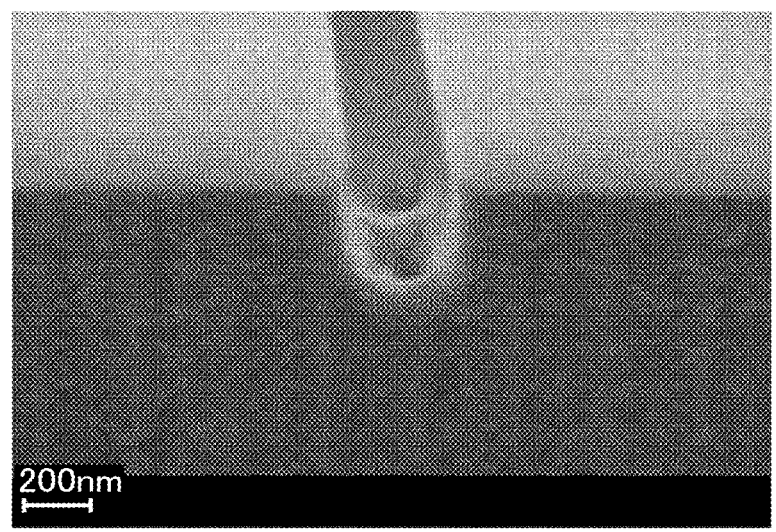

With respect to the conductive layer after the processing, presence or absence of breakage (crack) was confirmed by observation with scattering diffracted light and observation using a scanning electron microscope (SEM). As a result, as presented in Table A1, no crack occurred in either of the convex processing and the concave processing in Examples A2 and A3; cracks did not occur in the concave processing but occurred only in the convex processing in Examples A4 and A5. FIGS. 17A and 17B are illustrations of cracks observed in the convex processing in Example A4. FIG. 17A illustrates a result of diffraction by scattering diffracted light, and FIG. 17B illustrates a result of observation with SEM. As illustrated in FIG. 17A, the cracks were formed in a circular shape or an elliptical shape. Similar cracks were observed in the convex processing in Example A5.

Examples A6 to A8

In Example A6, a conductive layer of an inorganic oxide was formed by sputtering using a target comprising 99% by mass of $In_2O_3$ and 1% by mass of $ZrO_2$. The sputtering power at the time of film formation was set to 6.5 kW and the oxygen/argon flow rate was set to 2.5%. The other conditions were the same as those in Example A3. In Example A7, a concave mold having a radius of curvature of 86 mm was used. The other conditions were the same as those in Example A6. In Example A8, the conductive layer was formed so as to have a thickness of 220 nm. The other conditions were the same as those in Example A6.

The same evaluation as in Example A2 was then carried out. As a result, as presented in Table A1, no crack occurred in any of Examples A6 to A8.

Example A9

In Example A9, a conductive layer formed substrate was processed into a 3D curved surface shape using the curved surface forming apparatus 200 illustrated in FIG. 4. In this processing, a spherical concave mold having a radius of curvature of 131 mm and a diameter of 200 mm was prepared, and a silicone rubber sheet having a thickness of 0.3 mm was used for each of the substrate holding rubber sheet and the elastic sheet. The spherical concave mold is made of an aluminum alloy according to JIS A7075. After the conductive layer formed substrate was placed on the elastic sheet and the temperature of the concave mold was adjusted to 141° C., the bypass valve was opened and the pressure in the chamber was reduced to 300 Pa by pump suction. Subsequently, the bypass valve was closed and gas (air) was injected into the space above the elastic sheet from a gas injection hole. The air pressure was set to 0.1 MPa, and the elastic sheet and the conductive layer formed substrate were brought into close contact with the concave mold for 90 seconds to undergo plastic deformation. The pressure in the chamber was thereafter returned to the atmospheric pressure, whereby the elastic sheet and the conductive layer formed substrate were released from the mold, thus obtaining the conductive layer formed substrate having a spherical 3D curved surface. Both of convex processing and concave processing were performed as the bending processing. The other conditions were the same as those in Example A2.

The same evaluation as in Example A2 was then carried out. As a result, as presented in Table A1, no crack occurred in Example A9.

Example A10

In Example A10, an organic electronic device substrate having the same configuration as the third laminated substrate 30 was used. As an organic electronic layer, an oxidation-reactive electrochromic layer having a film thickness of 1.5 µm was formed by applying a mixed solution of (a) a radical polymerizable compound containing triarylamine represented by the following structural formula A, (b) polyethylene glycol diacrylate, (c) a photopolymerization initiator, and (d) tetrahydrofuran, at a mass ratio of a:b:c:d=10:5:0.15:85, and curing the applied solution with ultraviolet ray (UV) in a nitrogen atmosphere. As the polyethylene glycol diacrylate, KAYARAD PEG 400DA manufactured by Nippon Kayaku Co., Ltd. was used. As the photopolymerization initiator, IRGACURE 184 manufactured by BASF SE was used. In the third laminated substrate 30, the conductive layer 12 and the organic electronic material layer 14 are formed narrower than the resin substrate 11 and the base layer 13. On the other hand, in Example A10, the base layer, the conductive layer, and the organic electronic material layer were formed on the whole upper surface of the resin substrate. The other conditions were the same as those in Example A2.

Structural Formula A

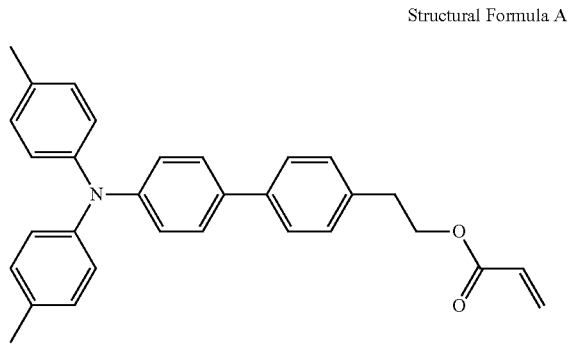 [SMILES: C=CC(=O)OCCc1ccc(-c2ccc(N(c3ccc(C)cc3)c3ccc(C)cc3)cc2)cc1]

The same evaluation as in Example A2 was then carried out. As a result, as presented in Table A1, no crack occurred in Example A10.

Example A11

In Example A11, a conductive layer formed substrate having the same configuration as the fourth laminated substrate 40 was used. Two conductive layer formed substrates each having the same configuration as the second laminated substrate 20 and having not yet been subjected to bending processing were prepared, and they were bonded with a double-sided adhesive layer having a thickness of 50 μm. As the double-sided adhesive layer, LA50 (optical clear adhesive (OCA) tape) manufactured by Nitto Denko Corporation was used. The other conditions were the same as those in Example A2.

The same evaluation as in Example A2 was then carried out. As a result, as presented in Table A1, no crack occurred in Example A11.

Example A12

In Example A12, an organic electronic device substrate having the same configuration as the fifth laminated substrate 50 was used. As the resin substrate, two pieces of a 156-mm-square plane-oriented polycarbonate sheet substrate having a thickness of 0.3 mm were prepared. A base layer was formed thereon. As the material of the base layer, UC1-088 (acrylic 1) manufactured by Meihan Shinku Kogyo Co., Ltd. was used. The thickness of the base layer was 9 μm. The hardness ($H_{IT}$) of the base layer was measured with a nanoindenter (PICODENTOR HM500 manufactured by FISCHER INSTRUMENTS K.K.). Next, a conductive layer of an inorganic oxide was formed on the base layer by sputtering using an ITO target comprising 90% by mass of $In_2O_3$ and 10% by mass of $SnO_2$. The sputtering power at the time of film formation was set to 6.5 kW, the oxygen/argon flow rate was set to 3.6%, and the thickness of the conductive layer was adjusted to 110 nm by controlling the film formation time. As a sputtering equipment, SOLARIS from Oerlikon was used. The conductive layer was formed using a mask in a region illustrated in FIG. 12A for one of the resin substrates and in a region illustrated in FIG. 12B for the other resin substrate. The thickness of the conductive layer was measured by Alpha-Step D-500 manufactured by KLA-Tencor Corporation. The sheet resistance of the conductive layer was measured using a 4-terminal resistance measuring instrument LORESTA GP manufactured by Mitsubishi Chemical Analytech Co., Ltd. In this measurement, the transmittance at 550 nm was measured using a spectrophotometer UH 4150 manufactured by Hitachi High-Tech Science Corporation.

Next, on the resin substrate having the conductive layer formed in the region illustrated in FIG. 12B, an oxidation-reactive electrochromic layer was formed in a region illustrated in FIG. 12C by coating. The electrochromic layer was formed under the same conditions as in Example A10.

In addition, on the resin substrate having the conductive layer formed in the region illustrated in FIG. 12A, a reduction-reactive electrochromic layer was formed in the region illustrated in FIG. 12C. In forming the reduction-reactive electrochromic layer, a methanol liquid dispersion of tin oxide containing 1% by mass of polyvinyl butyral was applied and annealed at 120° C. for 5 minutes, thus forming a nano particulate tin oxide layer having a thickness of 3 μm. Subsequently, a solution in which 2% by mass of a compound represented by the following structural formula B was dissolved in 2,2,3,3-tetrafluoropropanol was applied and adsorbed to the surface of the nano particulate tin oxide layer and thereafter annealed at 120° C. for 5 minutes. As the methanol liquid dispersion of tin oxide, CELNAX manufactured by Nissan Chemical Corporation was used.

Structural Formula B

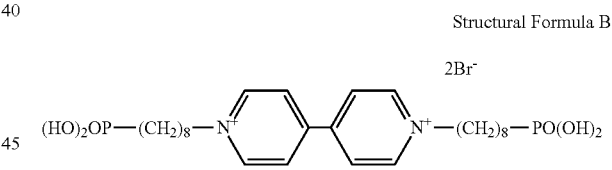

Next, an electrolyte solution was prepared by mixing (a) 1-ethyl-3-methylimidazolium $(FSO_2)_2N^-$ salt, (b) polyethylene glycol diacrylate, and (c) a photopolymerization initiator at a mass ratio of a:b:c=2:1:0.01. After filling the gap between the oxidation-reactive electrochromic layer and the reduction-reactive electrochromic layer with the electrolyte solution, an annealing treatment was conducted at 60° C. for 1 minute, followed by ultraviolet irradiation for curing, thus preparing a bonded body. At this time, the filling amount of the electrolyte solution was adjusted such that the average thickness of the solid electrolyte layer became 50 μm. As the polyethylene glycol diacrylate, KAYARAD PEG 400DA manufactured by Nippon Kayaku Co., Ltd. was used. As the photopolymerization initiator, IRGACURE 184 manufactured by BASF SE was used. Further, the periphery of the organic electronic material layer was filled with a UV-curable acrylic material and the UV-curable acrylic material was cured with UV to form a protective layer. As the UV-curable acrylic material, TB3050 manufactured by ThreeBond Co., Ltd. was used.

The same evaluation as in Example A2 was then carried out. As a result, as presented in Table A1, no crack occurred in Example A1.

In addition, coloring and decoloring of the organic electronic device substrate was evaluated. In this evaluation, a voltage of 2.0 V was applied to between one lead portion of the organic electronic material layer exposed from the protective layer being a positive pole and the other lead portion being a negative pole so that a charge of 7 mC/cm$^2$ was injected. As a result, it was confirmed that the oxidation-reactive electrochromic layer developed blue-green color and the reduction-reactive electrochromic layer developed blue color. In addition, it was confirmed that they normally performs coloring and decoloring operations as they became transparent when applied with a voltage of −0.6 V. The light transmittance was measured by a UV-Visible/NIR Spectrophotometer UH4150 (product of Hitachi High-Tech Science Corporation).

Example A13

In Example A13, an organic electronic device substrate having the same configuration as the sixth laminated substrate 60 was used. In the same manner as in Example A12 except that a 156-mm-sqaure optical oriented polyethylene terephthalate (PET) having a thickness of 0.1 mm was used as the resin substrate and that no base layer was formed, an organic electronic device substrate (electrochromic substrate) in a planar shape was prepared. Next, a processing resin substrate in a planar shape as illustrated in FIG. 16 was bonded to the outer surface of both resin substrates with a double-sided adhesive layer having a thickness of 50 μm. As the processing resin substrate, a polycarbonate sheet substrate having a thickness of 0.3 mm was used, and as the double-sided adhesive layer, LA50 (OCA tape) manufactured by Nitto Denko Corporation was used.

The same evaluation as in Example A2 was then carried out. As a result, as presented in Table A1, no crack occurred in Example A13. Also, the same evaluation for coloring and decoloring as in Example A12 was carried out. As a result, it was confirmed that the coloring and decoloring operations were normally performed.

Example A14

In Example A14, an organic electronic device substrate having the same configuration as the seventh laminated substrate 70 was used. A commercially available electrophoretic display type electronic paper was used for the portions corresponding to the resin substrate, the conductive layer, the organic electronic material layer, and the protective layer. On a surface of the resin substrate on the display surface side, a processing resin substrate in a planar shape as illustrated in FIG. 16 was bonded with a double-sided adhesive layer having a thickness of 50 μm. As the electrophoretic display type electronic paper, GDEP014TT1 manufactured by E Ink Holdings Inc. was used. As the processing resin substrate, a plane-oriented polycarbonate sheet substrate having a thickness of 0.3 mm was used. As the double-sided adhesive layer, LA50 (OCA tape) manufactured by Nitto Denko Corporation was used. This electrophoretic display type electronic paper is active matrix driven, and the conductive layer thereof is divided and formed in a matrix. The outline of GDEP014TT1 is as follows.

Screen Size: 1.43 Inch
Display Resolution: 128 (H)×296 (V) Pixel
Active Area: 14.464 (H)×33.448 (V) mm
Pixel Pitch: 0.113 (H)×0.113 (V) mm
Pixel Configuration: Rectangle
Outline Dimension: 18.3 (H)*42.7 (V)*0.607 (D) mm
Module weight: 0.87±0.1 g In the curved surface processing, the curved surface forming apparatus 100 illustrated in FIG. 1 was used. In this processing, a spherical concave mold having a radius of curvature of 86 mm and a diameter of 200 mm was prepared, and a silicone rubber sheet having a thickness of 0.3 mm was used for the elastic sheet. The spherical concave mold is made of an aluminum alloy according to JIS A7075. After the temperature of the concave mold was adjusted to 146° C., the organic electronic device substrate was placed on the elastic sheet with the processing resin substrate facing down, and the elastic sheet and the organic electronic device substrate were brought into close contact with the concave mold for 150 seconds by pump suction to undergo plastic deformation. The air exhausted from the pump suction hole was thereafter returned to the atmospheric pressure, whereby the elastic sheet and the organic electronic device substrate were released from the mold, thus obtaining the organic electronic device substrate having a spherical 3D curved surface.

Figure 18A:
FIGS. 18A and 18B are a photograph and a schematic diagram, respectively, of the laminated substrate after processing in Example A14.
Figure 18B:
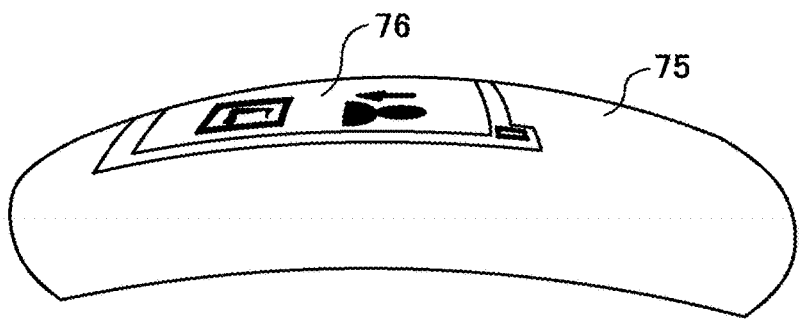

The same evaluation as in Example A2 was then carried out. As a result, as presented in Table A1, no crack occurred in Example A14. In addition, as illustrated in FIGS. 18A and 18B, it was confirmed that the display operation was normally performed. FIGS. 18A and 18B are a photograph and a schematic diagram, respectively, of the laminated substrate after processing in Example A14. As indicated in FIGS. 18A and 18B, display was uniform over the entire display area.

Example A15

In Example A15, an organic electronic device substrate having the same configuration as the fifth laminated substrate 50 was used. On one of the resin substrates of the organic electronic device substrate prepared in Example A12, a double-sided adhesive layer having a thickness of 50 μm and having a protective sheet on one side thereof was bonded. As the double-sided adhesive layer, LA50 (OCA tape) manufactured by Nitto Denko Corporation was used. As the protective sheet, a polypropylene film having a thickness of 25 μm was used.

The same evaluation as in Example A2 was then carried out. As a result, as presented in Table A1, no crack occurred in Example A15. Also, the same evaluation for coloring and decoloring as in Example A12 was carried out. As a result, it was confirmed that the coloring and decoloring operations were normally performed. Furthermore, after the protective sheet was peeled off, the laminated substrate was bonded to a spherical substrate with a radius of curvature of 130 mm using a vacuum bonding apparatus.

Comparative Example A1

Figure 19A:
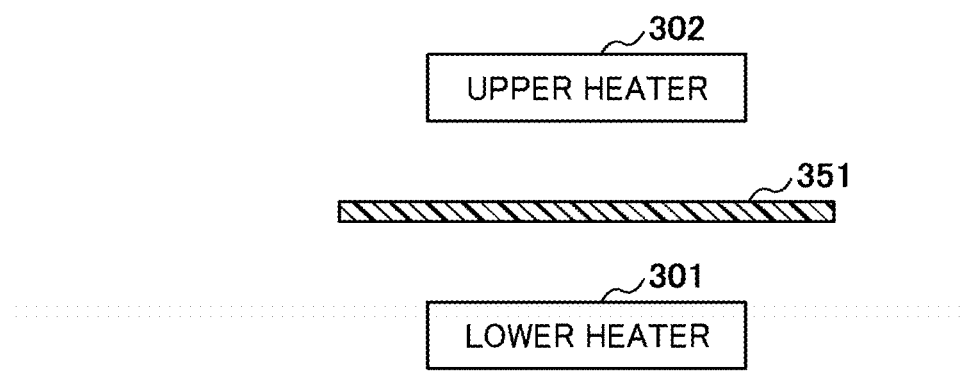
FIGS. 19A to 19C are schematic diagrams illustrating the steps in a curved surface forming method according to Comparative Example A1.
Figure 19B:
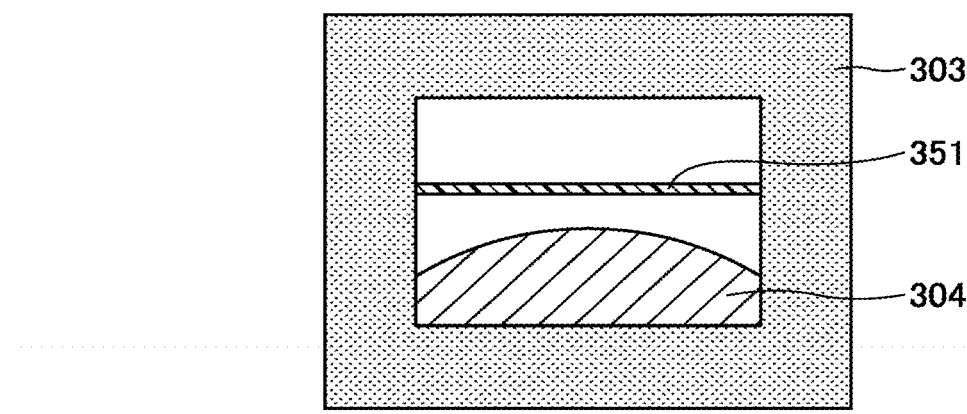
Figure 19C:
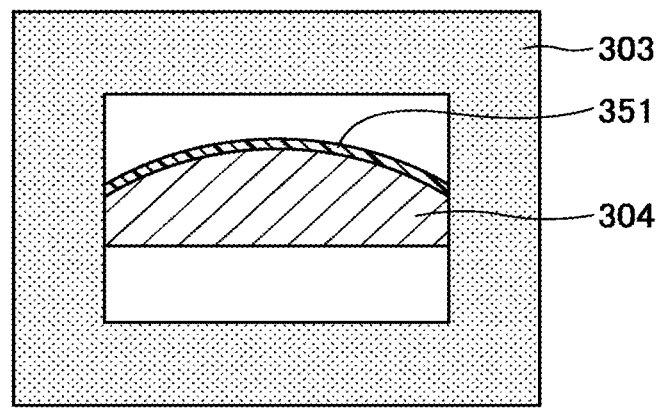

In Comparative Example A1, a conductive layer formed substrate prepared in the same manner as in Example A2 was processed into a 3D curved surface shape by using a vacuum forming apparatus. FIGS. 19A to 19C are schematic diagrams illustrating the steps in a curved surface forming method according to Comparative Example A1.

First, as illustrated in FIG. 19A, a conductive layer formed substrate 351 was heated and softened by a lower heater 301 and an upper heater 302. The lower heater 301 and the upper heater 302 are halogen heaters. The heating temperature was 146° C. Next, as illustrated in FIG. 19B, the end portion of the softened conductive layer formed substrate 351 was fixed to the inner wall of the chamber 303 of the vacuum forming apparatus. Next, as illustrated in FIG. 19C, the pressure inside the chamber 303 was reduced, and the conductive layer formed substrate 351 was pressed against a convex mold 304 whose temperature was controlled to 146° C. to undergo plastic deformation. As the convex mold 304, a spherical metal mold made of an aluminum alloy according to JIS A7075 having a radius of curvature of 131 mm and a diameter of 85 mm was used. After the conductive layer formed substrate 351 was plastically deformed, the pressure inside the chamber 303 was returned to the atmospheric pressure and the conductive layer formed substrate 351 was released from the convex mold 304, thus obtaining the conductive layer formed substrate 351 having a spherical 3D curved surface. Both of convex processing and concave processing were performed as the bending processing.

The same evaluation as in Example A2 was then carried out. As a result, as presented in Table A1, cracks occurred in both the convex processing and the concave processing in Comparative Example A1. These cracks were similar to those observed in the convex processing in Example A4 illustrated in FIGS. 17A and 17B.

TABLE B1

| Examples/ Comparative Examples | Laminated Substrate No. | Resin Substrate Material | Base Layer | | | | Film Forming Conditions for Conductive Layer | | |
|---|---|---|---|---|---|---|---|---|---|
| | | | Material | Coefficient of Thermal (%) | Hardness $H_{IT}$ (MPa) | Elastic Deformation $\eta_{IT}$ (%) | Power (kW) | $O_2$ Flow (%) | Time |
| Example B1 | Laminated Substrate 20 | PC | Acrylic 1 | 0.69 | 680 | 70 | 6.5 | 3.6 | 4 s × 2 times |
| Example B2 | Laminated Substrate 20 | PC | Acrylic 2 | 0.45 | 440 | 58 | 6.5 | 3.6 | 4 s × 2 times |
| Example B3 | Laminated Substrate 20 | PC | Acrylic 3 | 0.73 | 400 | 53 | 6.5 | 3.6 | 4 s × 2 times |
| Example B4 | Laminated Substrate 20 | PC | Acrylic 4 | 1.1 | 180 | 46 | 6.5 | 3.6 | 4 s × 1 time |
| Example B5 | Laminated Substrate 20 | PC | Acrylic 2 | 0.45 | 440 | 58 | 1.0 | 0.6 | 2.4 s × 22 times |
| Example B6 | Laminated Substrate 20 | PC | Acrylic 1 | 0.69 | 680 | 70 | 6.5 | 2.5 | 4 s × 2 times |
| Example B7 | Laminated Substrate 20 | PC | Acrylic 1 | 0.69 | 680 | 70 | 3.0 | 0.8 | 2.1 s × 8 times |
| Example B8 | Laminated Substrate 20 | PC | Acrylic 1 | 0.69 | 680 | 70 | 2.0 | 0.64 | 2.3 s × 11 times |
| Example B9 | Laminated Substrate 20 | PC | Acrylic 2 | 0.45 | 440 | 58 | 3.0 | 0.8 | 2.1 s × 8 times |
| Example B10 | Laminated Substrate 20 | PC | Acrylic 2 | 0.45 | 440 | 58 | 6.5 | 2.5 | 4 s × 4 times |
| Example B11 | Laminated Substrate 20 | PC | Acrylic 1 | 0.69 | 680 | 70 | 6.5 | 3.6 | 4 s × 2 times |
| Example B12 | Laminated Substrate 20 | PC | Acrylic 1 | 0.69 | 680 | 70 | 6.5 | 3.6 | 4 s × 2 times |
| Example B13 | Laminated Substrate 40 | PC | Acrylic 1 | 0.69 | 680 | 70 | 6.5 | 3.6 | 4 s × 2 times |
| Example B14 | Laminated Substrate 50 | PC | Acrylic 1 | 0.69 | 680 | 70 | 6.5 | 3.6 | 4 s × 2 times |
| Comparative Example B1 | Laminated Substrate 20 | PC | — | 1.3 (PC) | 150 (PC) | N/A | 6.5 | 3.6 | 4 s × 2 times |
| Comparative Example B2 | Laminated Substrate 20 | PC | — | 1.3 (PC) | 150 (PC) | N/A | 1.0 | 0.6 | 2.4 s × 22 times |
| Comparative Example B3 | Laminated Substrate 20 | PC | Acrylic 1 | 0.69 | 680 | 70 | 6.5 | 3.6 | 4 s × 2 times |

TABLE B2

| Examples/ Comparative Examples | Laminated Substrate No. | Conductive Layer | | | | | | Results of Bending Processing | | | |
|---|---|---|---|---|---|---|---|---|---|---|---|
| | | Material | Thickness (nm) | Hardness $H_{IT}$ (GPa) | Elastic Deformation Power $\eta_{IT}$ (%) | W/H Value | Sheet Resistance (Ω/□) | Transmittance (%) | Processing Equipment | Radius of Curvature (mm) | Convex Processing | Concave Processing | 3D-curved Surface |
| Example B1 | Laminated Substrate 20 | $In_2O_3$: 90% $SnO_2$: 10% | 110 | 2.7 | 62 | 2.4 | 49 | 83 | Apparatus 100 (FIG. 3) | 131 | Good | Good | Good |
| Example B2 | Laminated Substrate 20 | $In_2O_3$: 90% $SnO_2$: 10% | 110 | 3.2 | 70 | 2.4 | 49 | 83 | Apparatus 100 (FIG. 3) | 131 | Good | Good | Good |

TABLE B2-continued

| Examples/Comparative Examples | Laminated Substrate No. | Material | Conductive Layer Thickness (nm) | Hardness $H_{IT}$ (GPa) | Elastic Deformation Power $\eta_{IT}$ (%) | W/H Value | Sheet Resistance (Ω/□) | Transmittance (%) | Processing Equipment | Results of Bending Processing Radius of Curvature (mm) | Convex Processing | Concave Processing | 3D-curved Surface |
|---|---|---|---|---|---|---|---|---|---|---|---|---|---|
| Example B3 | Laminated Substrate 20 | In$_2$O$_3$: 90% SnO$_2$: 10% | 110 | 2.2 | 19 | 2.4 | 49 | 83 | Apparatus 100 (FIG. 3) | 131 | Poor (Crack) | Good | Good |
| Example B4 | Laminated Substrate 20 | In$_2$O$_3$: 90% SnO$_2$: 10% | 55 | — | — | 2.4 | 71 | 80 | Apparatus 100 (FIG. 3) | 131 | Poor (Crack) | Good | Good |
| Example B5 | Laminated Substrate 20 | In$_2$O$_3$: 90% SnO$_2$: 10% | 110 | — | — | No Peak | 47 | 84 | Apparatus 100 (FIG. 3) | 131 | Good | Good | Good |
| Example B6 | Laminated Substrate 20 | In$_2$O$_3$: 99% ZrO$_2$: 1% | 110 | 3.4 | 96 | 2.2 | 74 | 81 | Apparatus 100 (FIG. 3) | 131 | Good | Good | Good |
| Example B7 | Laminated Substrate 20 | In$_2$O$_3$: 99% ZrO$_2$: 1% | 110 | 3.1 | 77 | 4.2 | 61 | 81 | Apparatus 100 (FIG. 3) | 131 | Good | Good | Good |
| Example B8 | Laminated Substrate 20 | In$_2$O$_3$: 99% ZrO$_2$: 1% | 110 | 22 | 63 | 5.7 | 56 | 83 | Apparatus 100 (FIG. 3) | 131 | Good | Good | Good |
| Example B9 | Laminated Substrate 20 | In$_2$O$_3$: 99% ZrO$_2$: 1% | 110 | 3.1 | 77 | 4.2 | 61 | 81 | Apparatus 100 (FIG. 3) | 86 | Good | Good | Good |
| Example B10 | Laminated Substrate 20 | In$_2$O$_3$: 99% ZrO$_2$: 1% | 220 | — | — | 0.16 | — | — | Apparatus 100 (FIG. 3) | 131 | Good | Good | Good |
| Example B11 | Laminated Substrate 20 | In$_2$O$_3$: 90% SnO$_2$: 10% | 110 | 2.7 | 62 | 2.4 | 49 | 83 | Apparatus 200 (FIG. 4) | 131 | Good | Good | Good |
| Example B12 | Laminated Substrate 30 | In$_2$O$_3$: 90% SnO$_2$: 10% | 110 | 2.7 | 62 | 2.4 | 49 | 83 | Apparatus 100 (FIG. 3) | 131 | Good | Good | Good |
| Example B13 | Laminated Substrate 40 | In$_2$O$_3$: 90% SnO$_2$: 10% | 110 | 2.7 | 62 | 2.4 | 49 | 83 | Apparatus 100 (FIG. 3) | 131 | Good | Good | Good |
| Example B14 | Laminated Substrate 50 | In$_2$O$_3$: 90% SnO$_2$: 10% | 110 | 2.7 | 62 | 2.4 | 49 | 83 | Apparatus 100 (FIG. 3) | 131 | Good | Good | Good |
| Comparative Example B1 | Laminated Substrate 20 | In$_2$O$_3$: 90% SnO$_2$: 10% | 110 | — | — | 2.4 | 49 | 83 | Apparatus 100 (FIG. 3) | 131 | Poor (Crack) | Poor (Crack) | Good |
| Comparative Example B2 | Laminated Substrate 20 | In$_2$O$_3$: 90% SnO$_2$: 10% | 110 | — | — | No Peak | 47 | 84 | Apparatus 100 (FIG. 3) | 131 | Poor (Crack) | Poor (Crack) | Good |
| Comparative Example B3 | Laminated Substrate 20 | In$_2$O$_3$: 90% SnO$_2$: 10% | 110 | 2.7 | 62 | 2.4 | 49 | 83 | Apparatus 100 (FIG. 3) | 131 | Poor (Elastic Deformation) | Poor (Elastic Deformation) | Poor (Crack) |

Examples B1 to B4

In Examples B1 to B4, a transparent conductive substrate having the same configuration as the second laminated substrate 20 was used. As the resin substrate, a 156-mm-square plane-oriented polycarbonate sheet substrate having a thickness of 0.3 mm was prepared. A base layer was formed thereon. As the material of the base layer, four types of UV-curable acrylic resins whose cross-linking densities were adjusted, manufactured by Meihan Shinku Kogyo Co., Ltd., were used. In Examples B1, B2, B3, and B4, UC1-088 (acrylic 1), UC1-095 (acrylic 2), UC1-077 (acrylic 3), and UC1-090 (acrylic 4) were respectively used. The thickness of the base layer was 9 μm in Examples B1 and B4, and the thickness of the base layer was 5 μm in Examples B2 and B3. The hardness ($H_{IT}$) and the elastic deformation power ($\eta_{IT}$) of the base layer were measured with a nanoindenter (PICODENTOR HM500 manufactured by FISCHER INSTRUMENTS K.K.). The coefficient of thermal expansion of the base layer in the temperature range from 25° C. (room temperature) to 146° C. was measured using a TMA apparatus (Thermo plus EVO II manufactured by Rigaku Corporation). Next, a conductive layer of an inorganic oxide was formed on the base layer by sputtering using an ITO target comprising 90% by mass of In$_2$O$_3$ and 10% by mass of SnO$_2$. The sputtering power at the time of film formation was set to 6.5 kW, the oxygen/argon (Ar) flow rate (O$_2$ flow rate) was set to 3.6%, and the thickness of the conductive layer was adjusted by controlling the film formation time. As a sputtering equipment, SOLARIS from Oerlikon was used. The thickness of the conductive layer was measured by Alpha-Step D-500 manufactured by KLA-Tencor Corporation. The results are presented in Tables B1 and B2.

Next, the transparent conductive substrate was processed into a planar shape as illustrated in FIG. 16 using a laser beam. The outline of the transparent conductive substrate includes two straight portions parallel to each other and two arc-like curved portions each connecting both one ends of the straight portions. The distance between the straight portions is 54.5 mm and the distance between the curved portions (corresponding to the diameter of the circular arc) is 75.5 mm. A transmittance of the plate-like transparent conductive substrate was measured thereafter. In this measurement, the transmittance at 550 nm was measured using a spectrophotometer UH 4150 manufactured by Hitachi High-Tech Science Corporation. The hardness (HIT) and the elastic deformation power ($\eta_{IT}$) of the conductive layer were measured with a nanoindenter (PICODENTOR HM500 manufactured by FISCHER INSTRUMENTS K.K.). The crystallinity of the conductive layer was measured with an XRD apparatus (D8 DISCOVER manufactured by Bruker Corporation) to calculate the H/W value of the crystal peak from (222) plane of indium oxide under the following measurement conditions: the radiation source was a Cu tube (50 kV, 1,000 μm), the incident angle was 3 degrees, the slit width was 1 mm, and the collimator diameter was 1 mm. The sheet resistance of the conductive layer was measured using a 4-terminal resistance measuring instrument LORESTA GP manufactured by Mitsubishi Chemical Analytech Co., Ltd. The results are presented in Table B2.

The transparent conductive substrate was thereafter processed into a 3D curved surface shape using the curved surface forming apparatus 100 illustrated in FIG. 3 equipped with the convex mold. In this processing, a spherical concave mold having a radius of curvature of 131 mm and a diameter of 200 mm and a convex mold paired with the spherical concave mold were prepared, and a silicone rubber sheet having a thickness of 0.3 mm was used for the elastic sheet. The spherical concave mold and the convex mold are made of an aluminum alloy according to JIS A7075. After the temperature of the concave mold was adjusted to 146° C., the conductive layer formed substrate was placed on the elastic sheet, and the elastic sheet and the conductive layer formed substrate were brought into close contact with the concave mold for 60 seconds by pump suction to undergo plastic deformation. Subsequently, the convex mold controlled to have a temperature of 146° C. was lowered to conduct pressing for 90 seconds. The air exhausted from the pump suction hole was thereafter returned to the atmospheric pressure, whereby the elastic sheet and the transparent conductive substrate were released from the mold, thus obtaining the transparent conductive substrate having a spherical 3D curved surface. Both of convex processing and concave processing were performed as the bending processing.

With respect to the conductive layer after the processing, presence or absence of breakage (crack) was confirmed by observation with scattering diffracted light and observation using a scanning electron microscope (SEM). As a result, as presented in Table B2, no crack occurred in either of the convex processing and the concave processing in Examples B1 and B2; cracks did not occur in the concave processing but occurred only in the convex processing in Examples B3 and B4. FIGS. 17A and 17B are illustrations of cracks observed in the convex processing in Example B3. FIG. 17A illustrates a result of diffraction by scattering diffracted light, and FIG. 17B illustrates a result of observation with SEM. As illustrated in FIG. 17A, the cracks were formed in a circular shape or an elliptical shape. Similar cracks were observed in the convex processing in Example B4.

Example B5

In Example B5, based on Example B2, the film forming conditions for the conductive layer were made different from those in Example B1 to form a conductive layer having a different property from that of Example B 1. The other conditions were the same as those in Example B 1. The film forming conditions for the conductive layer and the properties of the conductive layer are presented in Tables B1 and B2.

The same evaluation as in Example B2 was then carried out. As a result, as presented in Table B2, cracks occurred neither in the convex processing nor in the concave processing in Example B5.

Figure 20:
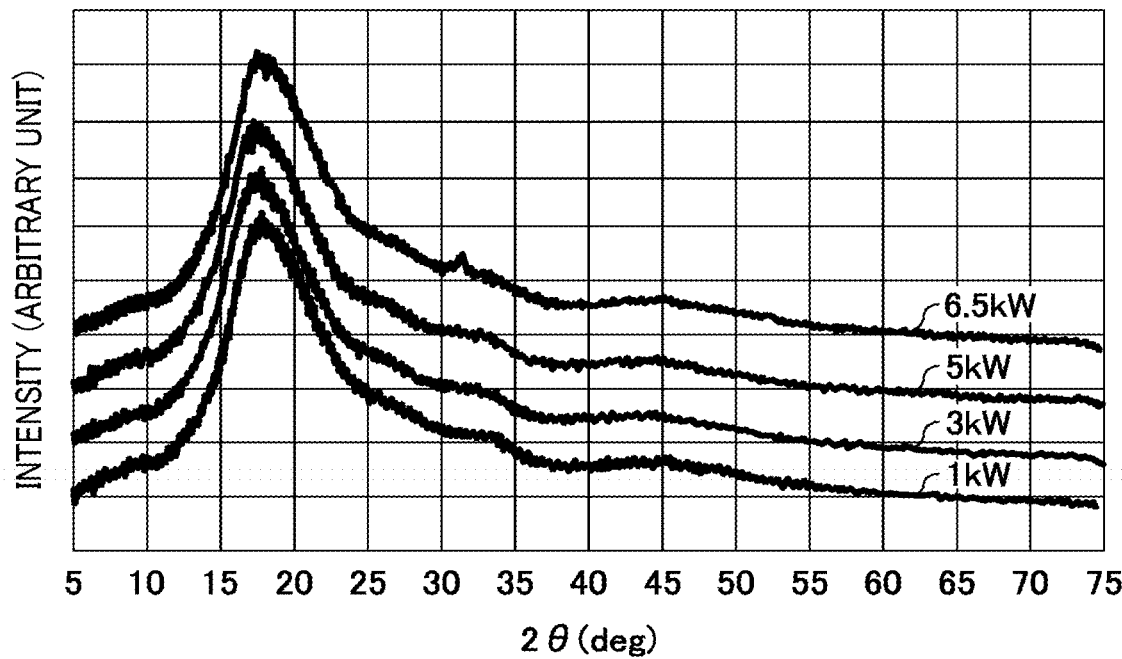
FIG. 20 is a graph presenting measurement results by X-ray diffractometry for samples obtained by varying sputtering power.
Figure 21:
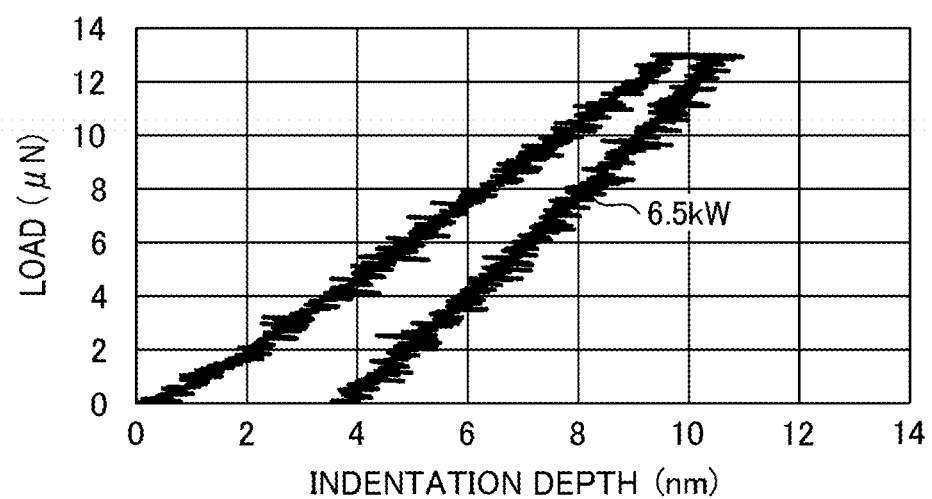
FIG. 21 is a graph presenting measurement results by a nanoindenter for Example B1.

FIG. 20 is a graph presenting measurement results by XRD for samples obtained with varying sputtering power, including Examples B2 and B5. FIG. 21 is a graph presenting measurement results by the nanoindenter for Example B 1. As illustrated in FIG. 20, the higher the sputtering power, the higher the H/W value. The nanoindenter evaluates the change in load when the probe is indented for 10 nm against the conductive layer having a film thickness of 110 nm.

Examples B6 to B8

In Examples B6 to B8, a conductive layer of an inorganic oxide was formed by sputtering using a target comprising 99% by mass of $In_2O_3$ and 1% by mass of $ZrO_2$. The film forming conditions for the conductive layer were varied among Examples B6 to B8. The other conditions were the same as those in Example B1. The film forming conditions for the conductive layer and the properties of the conductive layer are presented in Tables B1 and B2.

The same evaluation as in Example B1 was then carried out. As a result, as presented in Table B2, no crack occurred in any of Examples B6 to B8.

Figure 22:
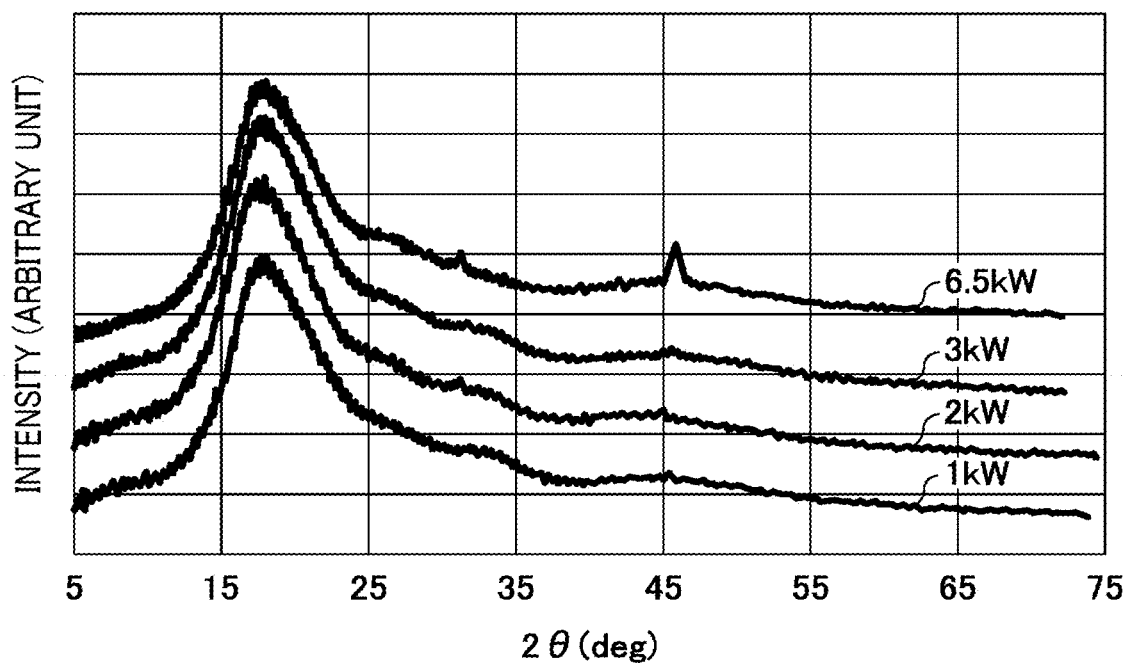
FIG. 22 is a graph presenting measurement results by X-ray diffractometry for samples obtained by varying sputtering power.
Figure 23:
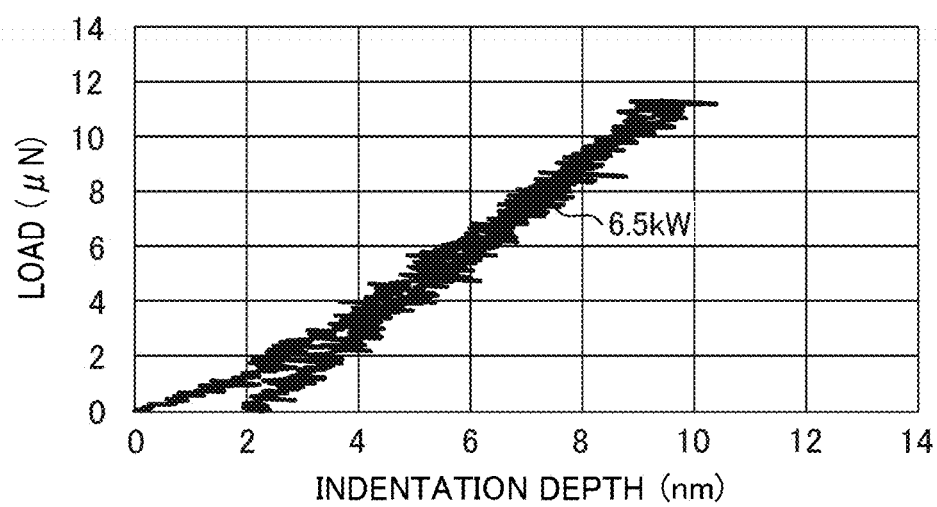
FIG. 23 is a graph presenting measurement results by a nanoindenter for Example B6.
Figure 24:
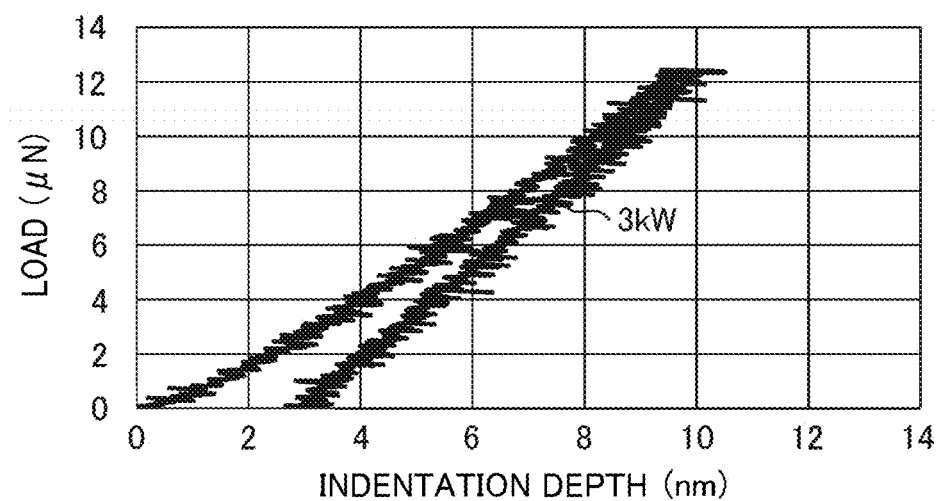
FIG. 24 is a graph presenting measurement results by a nanoindenter for Example B7.
Figure 25:
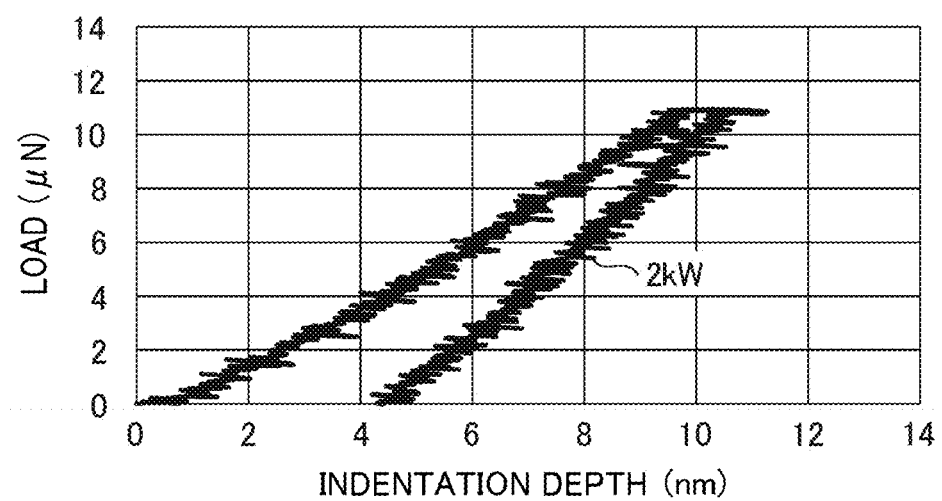
FIG. 25 is a graph presenting measurement results by a nanoindenter for Example B8.

FIG. 22 is a graph presenting measurement results by XRD for samples obtained with varying sputtering power, including Examples B6 to B8. FIGS. 23, 24, and 25 are graphs presenting measurement results by the nanoindenter for Example B6, Example B7, and Example B8, respectively. As illustrated in FIG. 22, the higher the sputtering power, the higher the H/W value. Further, as illustrated in FIGS. 23 to 25, the higher the sputtering power, the higher the elasticity. In particular, in Example B6 (FIG. 23), an elastic deformation power was almost 100%.

Example B9

In Example B9, based on Example B7, a base layer of the acrylic 2 having a thickness of 5 μm was formed under the same conditions as in Example B2 and a concave mold having a radius of curvature of 86 mm was used. The other conditions were the same as those in Example B7.

The same evaluation as in Example B1 was then carried out. As a result, as presented in Table B2, no crack occurred in Example B9.

Example B10

In Example B10, based on Example B6, a base layer of the acrylic 2 having a thickness of 5μm was formed under the same conditions as in Example B2 and a conductive layer having a thickness of 220 nm was formed under different conditions. The other conditions were the same as those in Example B6.

The same evaluation as in Example B1 was then carried out. As a result, as presented in Table B2, no crack occurred in Example B10.

Example B11

In Example B11, a transparent conductive substrate was processed into a 3D curved surface shape using the curved surface forming apparatus 200 illustrated in FIG. 4. In this processing, a spherical concave mold having a radius of curvature of 131 mm and a diameter of 200 mm was prepared, and a silicone rubber sheet having a thickness of 0.3 mm was used for each of the substrate holding rubber sheet and the elastic sheet. The spherical concave mold is made of an aluminum alloy according to JIS A7075. After the transparent conductive substrate was placed on the elastic sheet and the temperature of the concave mold was adjusted to 141° C., the bypass valve was opened and the pressure in the chamber was reduced to 300 Pa by pump suction. Subsequently, the bypass valve was closed and gas (air) was injected into the space above the elastic sheet from a gas injection hole. The air pressure was set to 0.1 MPa, and the elastic sheet and the conductive layer formed substrate were brought into close contact with the concave mold for 90 seconds to undergo plastic deformation. The pressure in the chamber was thereafter returned to the atmospheric pressure, whereby the elastic sheet and the transparent conductive substrate were released from the mold, thus obtaining the transparent conductive substrate having a spherical 3D curved surface. Both of convex processing and concave processing were performed as the bending processing. The other conditions were the same as those in Example B1.

The same evaluation as in Example B1 was then carried out. As a result, as presented in Table B2, no crack occurred in Example B11.

Example B12

In Example B12, an organic electronic device substrate having the same configuration as the third laminated substrate 30 was used. As an organic electronic layer, an oxidation-reactive electrochromic layer having a film thickness of 1.5 μm was formed by applying a mixed solution of (a) a radical polymerizable compound containing triarylamine represented by the following structural formula A, (b) polyethylene glycol diacrylate, (c) a photopolymerization initiator, and (d) tetrahydrofuran, at a mass ratio of a:b:c:d=10:5:0.15:85, and curing the applied solution with ultraviolet ray (UV) in a nitrogen atmosphere. As the polyethylene glycol diacrylate, KAYARAD PEG 400DA manufactured by Nippon Kayaku Co., Ltd. was used. As the photopolymerization initiator, IRGACURE 184 manufactured by BASF SE was used. In the organic electronic device substrate 30, the conductive layer 12 and the organic electronic material layer 14 are formed narrower than the resin substrate 11 and the base layer 13. On the other hand, in Example B12, the base layer, the conductive layer, and the organic electronic material layer were formed on the whole upper surface of the resin substrate. The other conditions were the same as those in Example B2.

Structural Formula A

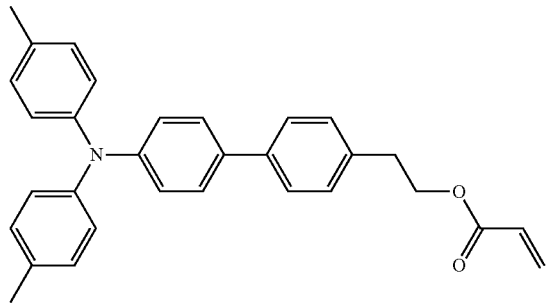

The same evaluation as in Example B1 was then carried out. As a result, as presented in Table B2, no crack occurred in Example B12.

Example B13

In Example B13, a transparent conductive substrate having the same configuration as the fourth laminated substrate 40 was used. Two transparent conductive substrates each having the same configuration as the second laminated substrate 20 and having not yet been subjected to bending processing were prepared, and they were bonded with a double-sided adhesive layer having a thickness of 50 μm. As the double-sided adhesive layer, LA50 (optical clear adhesive (OCA) tape) manufactured by Nitto Denko Corporation was used. The other conditions were the same as those in Example B 1.

The same evaluation as in Example B1 was then carried out. As a result, as presented in Table B2, no crack occurred in Example B13.

Example B14

In Example B14, an organic electronic device substrate having the same configuration as the fifth laminated substrate 50 was used. As the resin substrate, two pieces of a 156-mm-square plane-oriented polycarbonate sheet substrate having a thickness of 0.3 mm were prepared. A base layer was formed thereon. As the material of the base layer, UC1-088 (acrylic 1) manufactured by Meihan Shinku Kogyo Co., Ltd. was used. The thickness of the base layer was 9 μm. Next, the transparent conductive substrate was processed into a planar shape as illustrated in FIG. 16 using a laser beam.

Next, a conductive layer of an inorganic oxide was formed on the base layer by sputtering using an ITO target comprising 90% by mass of $In_2O_3$ and 10% by mass of $SnO_2$. The sputtering power at the time of film formation was set to 6.5 kW, the oxygen/argon flow rate ($O_2$ flow rate) was set to 3.6%, and the thickness of the conductive layer was adjusted to 110 nm by controlling the film formation time. As a sputtering equipment, SOLARIS from Oerlikon was used. The conductive layer was formed using a mask in a region illustrated in FIG. 12A for one of the resin substrates and in a region illustrated in FIG. 12B for the other resin substrate. The thickness of the conductive layer was measured by Alpha-Step D-500 manufactured by KLA-Tencor Corporation.

Next, on the resin substrate having the conductive layer formed in the region illustrated in FIG. 12B, an oxidation-reactive electrochromic layer was formed in a region illustrated in FIG. 12C by coating. The electrochromic layer was formed under the same conditions as in Example B11.

In addition, on the resin substrate having the conductive layer formed in the region illustrated in FIG. 12A, a reduction-reactive electrochromic layer was formed in the region illustrated in FIG. 12C. In forming the reduction-reactive electrochromic layer, a methanol liquid dispersion of tin oxide containing 1% by mass of polyvinyl butyral was applied and annealed at 120° C. for 5 minutes, thus forming a nano particulate tin oxide layer having a thickness of 3 μm. Subsequently, a solution in which 2% by mass of a compound represented by the following structural formula B was dissolved in 2,2,3,3-tetrafluoropropanol was applied and adsorbed to the surface of the nano particulate tin oxide layer and thereafter annealed at 120° C. for 5 minutes. As the methanol liquid dispersion of tin oxide, CELNAX manufactured by Nissan Chemical Corporation was used.

Structural Formula B

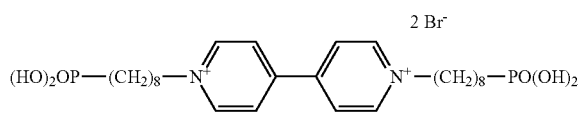

Next, an electrolyte solution was prepared by mixing (a) 1-ethyl-3-methylimidazolium $(FSO_2)_2N^-$ salt, (b) polyethylene glycol diacrylate, and (c) a photopolymerization initiator at a mass ratio of a:b:c=2:1:0.01. After filling the gap between the oxidation-reactive electrochromic layer and the reduction-reactive electrochromic layer with the electrolyte solution, an annealing treatment was conducted at 60° C. for 1 minute, followed by ultraviolet irradiation for curing, thus preparing a bonded body. At this time, the filling amount of the electrolyte solution was adjusted such that the average thickness of the solid electrolyte layer became 30 μm. As the polyethylene glycol diacrylate, KAYARAD PEG 400DA manufactured by Nippon Kayaku Co., Ltd. was used. As the photopolymerization initiator, IRGACURE 184 manufactured by BASF SE was used. Further, the periphery of the organic electronic material layer was filled with a UV-curable acrylic material and the UV-curable acrylic material was cured with UV to form a protective layer. As the UV-curable acrylic material, TB3050 manufactured by ThreeBond Co., Ltd. was used.

The same evaluation as in Example B1 was then carried out. As a result, as presented in Table B2, no crack occurred in Example B13.

In addition, coloring and decoloring of the organic electronic device substrate was evaluated. In this evaluation, a voltage of 2.0 V was applied to between one lead portion of the organic electronic material layer exposed from the protective layer being a positive pole and the other lead portion being a negative pole so that a charge of 7 mC/cm$^2$ was injected. As a result, it was confirmed that the oxidation-reactive electrochromic layer developed blue-green color and the reduction-reactive electrochromic layer developed blue color. In addition, it was confirmed that they normally perform coloring and decoloring operations as they became transparent when applied with a voltage of −0.6 V. The light transmittance was measured by a UV-Visible/NIR Spectrophotometer UH4150 (product of Hitachi High-Tech Science Corporation).

Comparative Example B1

In Comparative Example B1, based on Example B1, a polycarbonate sheet substrate having no base layer was used. The other conditions were the same as those in Example B1.

The hardness ($H_{IT}$) of the polycarbonate sheet substrate was measured with a nanoindenter (PICODENTOR HM500 manufactured by FISCHER INSTRUMENTS K.K.). The coefficient of thermal expansion of the polycarbonate sheet substrate in the temperature range from 25° C. (room temperature) to 146° C. was measured using a TMA apparatus (Thermo plus EVO II manufactured by Rigaku Corporation). The results are presented in Tables B1 and B2.

The same evaluation as in Example B1 was then carried out. As a result, cracks occurred in both the convex processing and the concave processing in Comparative Example B1.

Comparative Example B2

In Comparative Example B2, based on Comparative Example B 1, the film forming conditions for the conductive layer were made different from those in Example 1 to form a conductive layer having the same property as that in Example B5. The other conditions were the same as those in Comparative Example B1. The film forming conditions for the conductive layer and the properties of the conductive layer are presented in Tables B1 and B2.

As a result, cracks occurred in both the convex processing and the concave processing in Comparative Example B2.

Comparative Example B3

In Comparative Example B3, based on Example B 1, the temperature of each of the concave mold and the convex mold was adjusted to 25° C. when processing the transparent conductive substrate. The other conditions were the same as those in Example B 1.

The same evaluation as in Example B1 was then carried out. As a result, the resin substrate did not soften and therefore the transparent conductive substrate elastically deformed without plastically deforming, thus failed to be processed into a 3D curved surface shape. As presented in Table B2, although no crack occurred in the conductive layer, a transparent conductive substrate having a 3D curved surface could not be obtained.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A method for forming, using a forming apparatus including a temperature-controlled mold and an elastic sheet, a three-dimensional curved surface on a laminated substrate, comprising:
   arranging a laminated substrate on a top surface of the elastic sheet that faces away from a concave surface of the mold, the concave surface having the three-dimensional curved surface, the mold comprising a first hole connecting a back side of the mold and the concave surface, the elastic sheet having a second hole penetrating front and back surfaces thereof in a thickness direction and disposed on a flat surface around the three-dimensional curved surface so as to form a closed space to close the three-dimensional curved surface, the laminated substrate completely covering the second hole of the elastic sheet, the laminated substrate comprising a support substrate and a conductive layer on the support substrate, and the support substrate comprises a resin substrate comprising a thermoplastic resin and a base layer on the resin substrate, the base layer having a hardness of 180 MPa or more, which is higher than a hardness of the resin substrate;
   deforming the elastic sheet while the laminated substrate is arranged on the top surface of the elastic sheet by pumping through the first hole to exhaust air in the closed space between the concave surface of the mold and the elastic sheet; and
   bringing the elastic sheet into direct contact with the temperature-controlled mold to soften the resin substrate.

2. The method of claim 1, wherein the deforming step includes deforming the elastic sheet due to a difference in atmospheric pressure between air above and below the elastic sheet.

3. The method of claim 1, wherein the mold has the three-dimensional curved surface to be brought into close contact with the laminated substrate, the three-dimensional curved surface being larger than the laminated substrate.

4. The method of claim 3, wherein the mold is a concave mold.

5. The method of claim 1, wherein a surface of the support substrate has a hardness of 180 MPa or more.

6. The method of claim 1, wherein the laminated substrate further comprises an organic electronic material layer on the conductive layer.

7. The method of claim 1, wherein the laminated substrate further comprises a processing resin substrate on one surface of the support substrate to be brought into close contact with the mold.

8. The method of claim 7, wherein the processing resin substrate is bonded to the support substrate with a detachable adhesive layer.

9. The method of claim 1, further comprising:
bonding the laminated substrate to another support after the three-dimensional curved surface has been formed on the laminated substrate.

10. The method of claim 9, wherein the laminated substrate further comprises a protective sheet bonded to the support substrate via an adhesive layer, the protective sheet being detachable while the adhesive layer remains on the support substrate.

11. The method of claim 1, wherein, in the deforming step, the elastic sheet deforms isotropically.

12. A method for forming, using a forming apparatus including a temperature-controlled mold and an elastic sheet, a three-dimensional curved surface on a laminated substrate, comprising:
arranging a laminated substrate on a substrate-holding sheet so that the laminated substrate is vertically suspended between the elastic sheet and a surface of the temperature-controlled mold, the surface of the temperature-controlled molded being a concave surface having the three-dimensional curved surface, the temperature-controlled mold comprising a first hole connecting a back side of the mold and the concave surface, the substrate-holding sheet having a second hole penetrating front and back surfaces thereof in a thickness direction and disposed on a flat surface around the three-dimensional curved surface to form a closed space to close the three-dimensional curved surface, and the laminated substrate completely covering the second hole of the substrate-holding sheet, the laminated substrate comprising a support substrate and a conductive layer on the support substrate, and the support substrate comprises a resin substrate comprising a thermoplastic resin and a base layer on the resin substrate, the base layer having a hardness of 180 MPa or more, which is higher than a hardness of the resin substrate; and
deforming the elastic sheet while the laminated substrate is arranged on the substrate-holding sheet by pumping through the first hole to exhaust air in the closed space between the concave surface of the mold and the elastic sheet so as to force the laminated substrate into direct contact with the concave surface of the temperature-controlled mold, to soften the resin substrate.

13. The method of claim 1, further comprising:
stopping the pumping to open the first hole to an atmosphere so that the elastic sheet returns to its original shape, and
releasing the laminated substrate from the mold.

14. The method of claim 12, further comprising:
stopping the pumping to open the first hole to an atmosphere so that the elastic sheet returns to its original shape, and
releasing the laminated substrate from the mold.

* * * * *